United States Patent
Kobayashi et al.

(10) Patent No.: US 12,143,011 B2
(45) Date of Patent: Nov. 12, 2024

(54) ELECTRIC POWER CONVERSION APPARATUS

(71) Applicant: DENSO CORPORATION, Kariya (JP)

(72) Inventors: Naoto Kobayashi, Nisshin (JP); Syuji Kurauchi, Kariya (JP); Yuuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 17/734,761

(22) Filed: May 2, 2022

(65) Prior Publication Data

US 2022/0263411 A1    Aug. 18, 2022

Related U.S. Application Data

(63) Continuation of application No. PCT/JP2020/040535, filed on Oct. 28, 2020.

(30) Foreign Application Priority Data

Oct. 30, 2019    (JP) .................. 2019-197370

(51) Int. Cl.
    *H02M 3/156*      (2006.01)
    *H02M 3/155*      (2006.01)
    *H02M 7/00*      (2006.01)

(52) U.S. Cl.
    CPC ........... *H02M 3/155* (2013.01); *H02M 7/003* (2013.01)

(58) Field of Classification Search
    CPC ............................. H02M 3/155; H02M 7/003

(Continued)

(56) References Cited

U.S. PATENT DOCUMENTS

| | | | |
|---|---|---|---|
| 5,834,132 A | 11/1998 | Hasegawa et al. | |
| 8,803,491 B2* | 8/2014 | Kobayashi | H02M 3/158 |
| | | | 323/225 |

(Continued)

FOREIGN PATENT DOCUMENTS

| | | | |
|---|---|---|---|
| DE | 102007049173 A1 | 4/2009 | |
| EP | 2043244 B1 * | 7/2019 | ............... B60K 6/28 |
| WO | 2015072009 A1 | 5/2015 | |

OTHER PUBLICATIONS

Jain et al., "PWM Control of Dual Active Bridge: Comprehensive Analysis and Experimental Verification," IEEE Transactions on Power Electronics, vol. 26, No. 4, Apr. 2011, pp. 1215-1227.

(Continued)

*Primary Examiner* — Yemane Mehari
(74) *Attorney, Agent, or Firm* — Oliff PLC

(57) ABSTRACT

An electric power conversion apparatus has an input and output terminal, and a switch unit, and turns on and off the switch unit to transfer electric power from an electric storage unit connected to the input terminal to a power supply target connected to the output terminal. When reverse conduction current flows in the switch unit, it causes a larger conduction loss in an off state than an on state. The apparatus includes: a control unit that determines whether there is a request for increasing an amount of heat generation due to the electric power transfer, and when it is determined that there is the request, turns off the switch unit in which the reverse conduction current flows during the electric power transfer and, when it is determined that there is no request, turns on the switch unit in which the reverse conduction current flows during the electric power transfer.

4 Claims, 15 Drawing Sheets

(58) Field of Classification Search
USPC .......................................................... 323/282
See application file for complete search history.

(56) References Cited

U.S. PATENT DOCUMENTS

2013/0314950 A1* 11/2013 Hembach .......... H02M 3/33592
363/27
2020/0259360 A1 8/2020 Tagawa et al.

OTHER PUBLICATIONS

GaN Systems, Inc., Preliminary Datasheet, GS66516T, Top Cooled 650V Enhancement Mode GaN Transistor, 2015, pp. 1-8.

* cited by examiner

<NORMAL MODE>

<NORMAL MODE>

FIG.4
<HEAT GENERATION MODE>
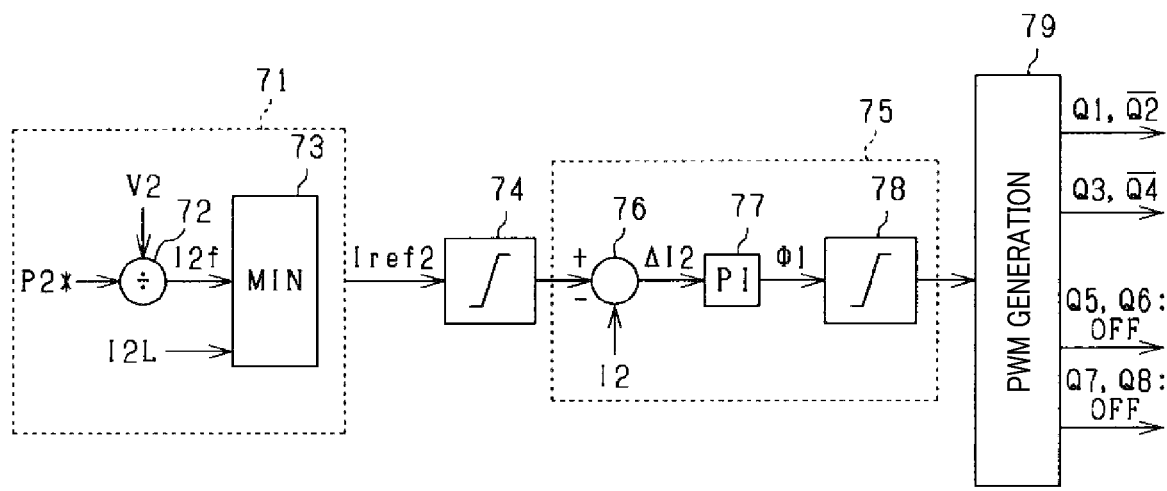
<HEAT GENERATION MODE>
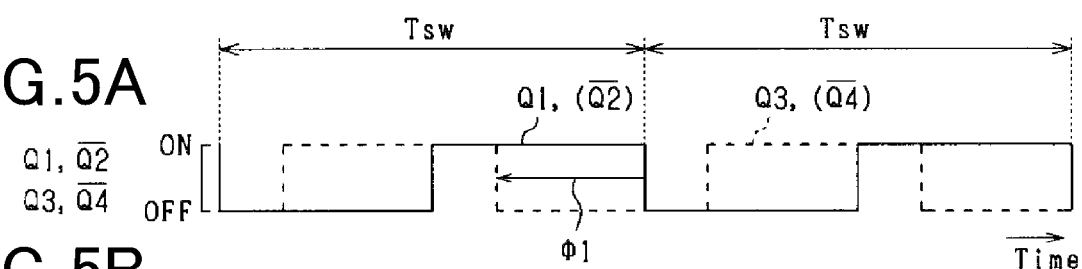
FIG.5A
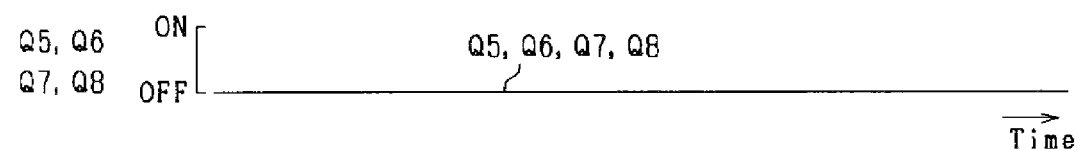
FIG.5B

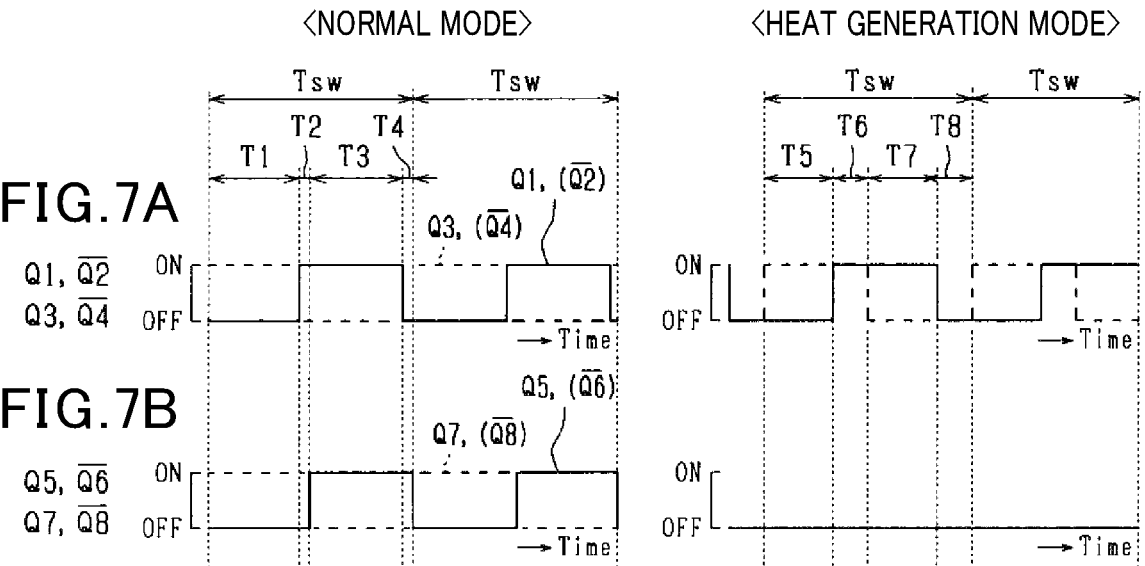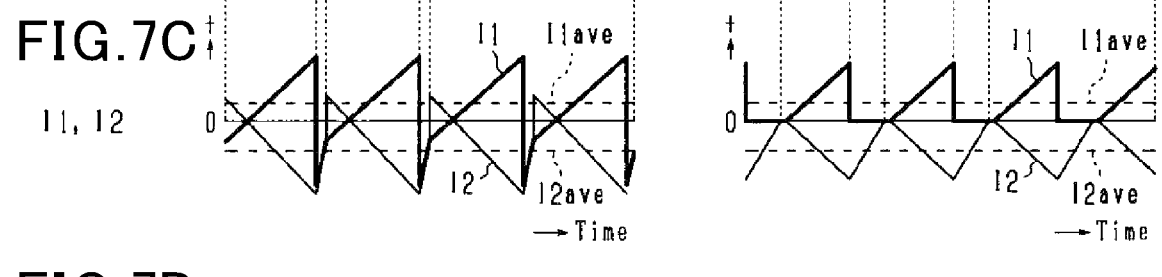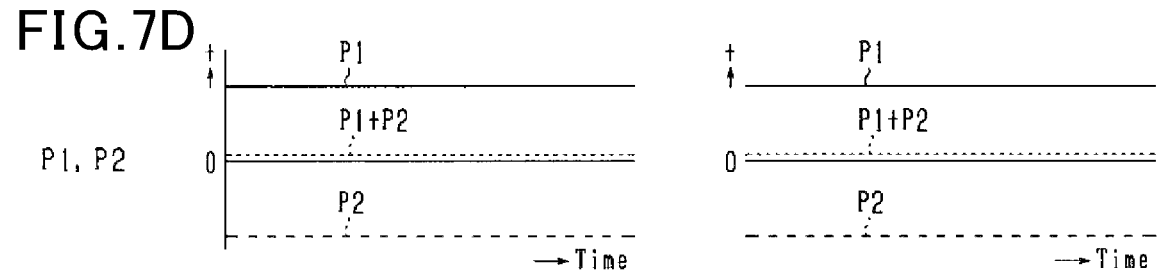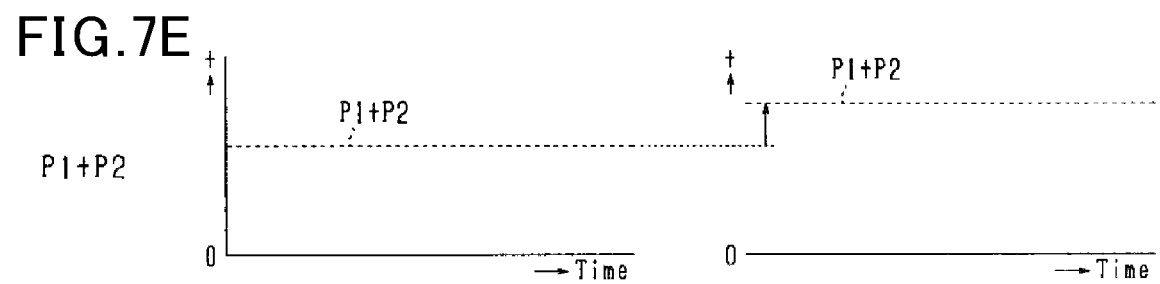

⟨NORMAL MODE, T2⟩

⟨NORMAL MODE, T4⟩

⟨NORMAL MODE, T1⟩

⟨NORMAL MODE, T3⟩

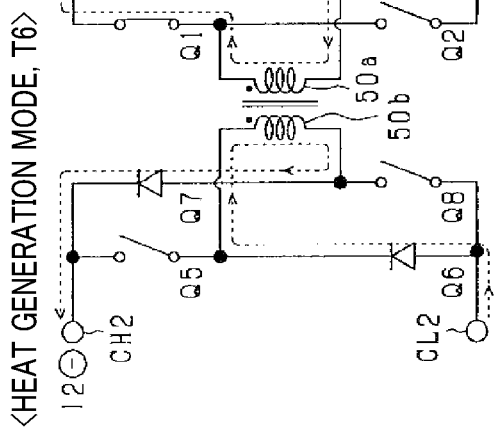
FIG.9A <HEAT GENERATION MODE, T5>
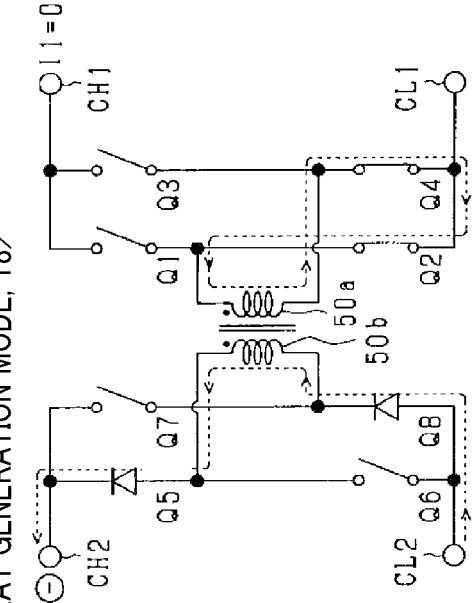
FIG.9B <HEAT GENERATION MODE, T6>
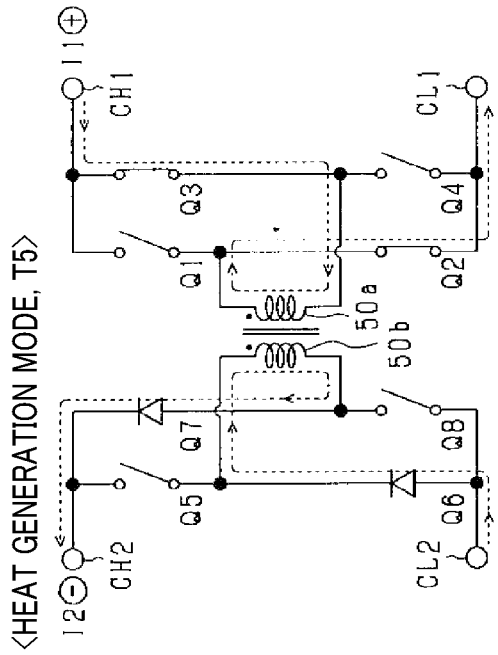
FIG.9C <HEAT GENERATION MODE, T7>
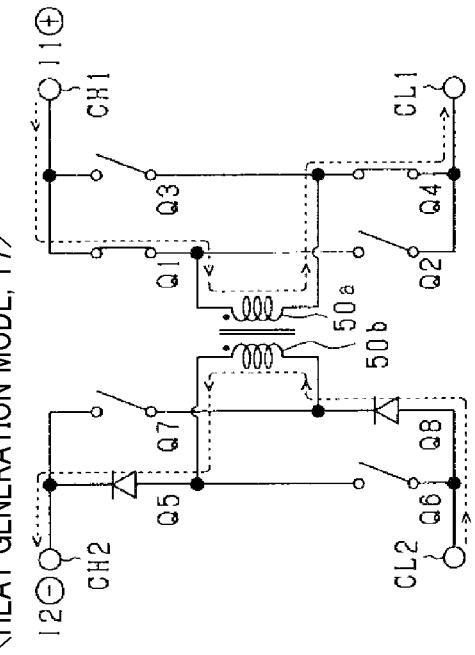
FIG.9D <HEAT GENERATION MODE, T8>

⟨WITHOUT TEMPORARY ON⟩　　　⟨WITH TEMPORARY ON⟩
FIG.14A Q1, $\overline{Q2}$, $\overline{Q3}$, Q4
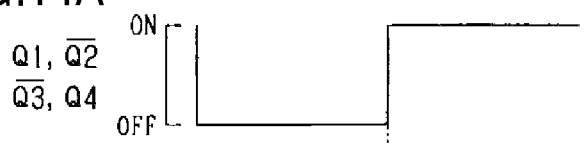
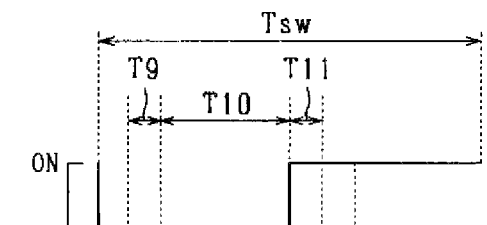
FIG.14B Q5
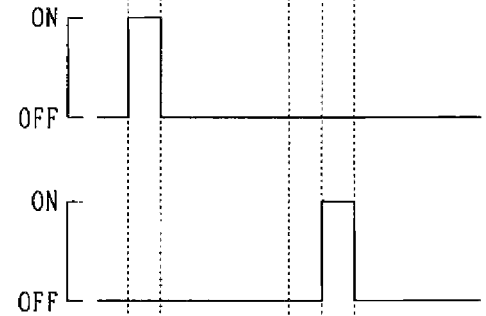
FIG.14C Q6
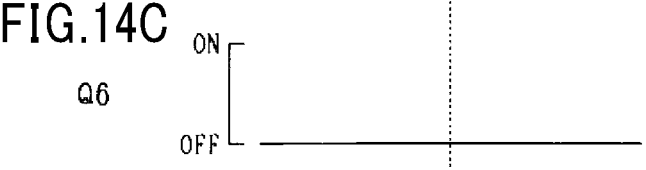
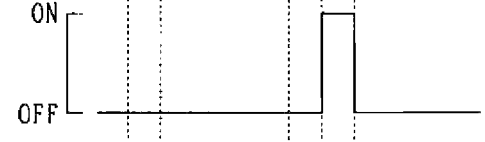
FIG.14D Q7
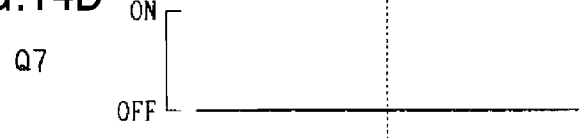
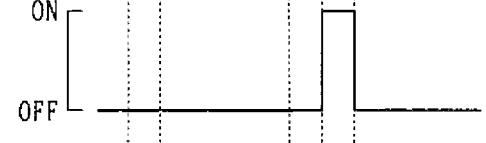
FIG.14E Q8
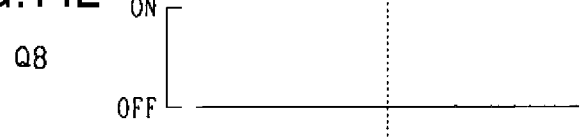
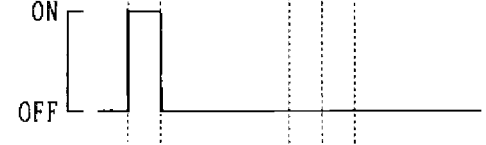
FIG.14F I1
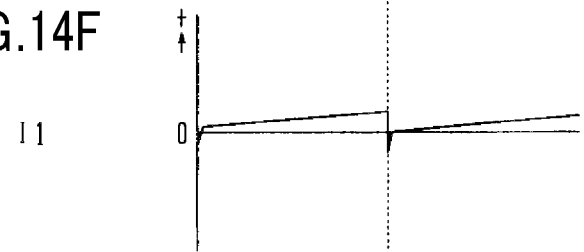
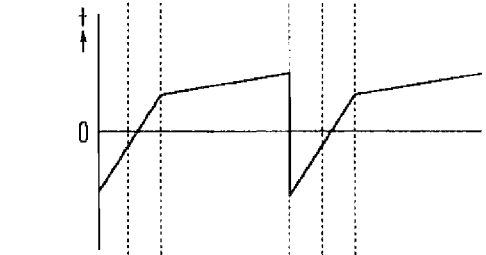
FIG.14G I2
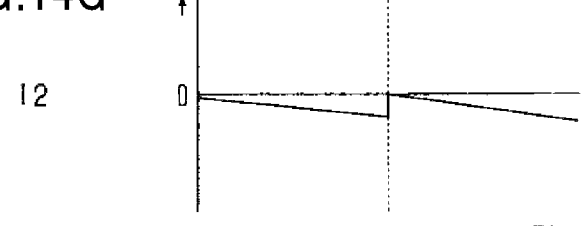
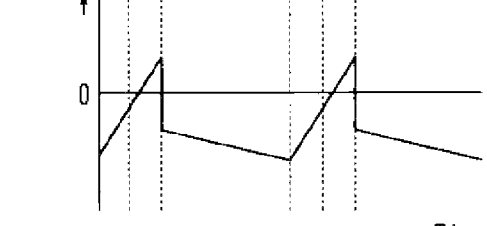

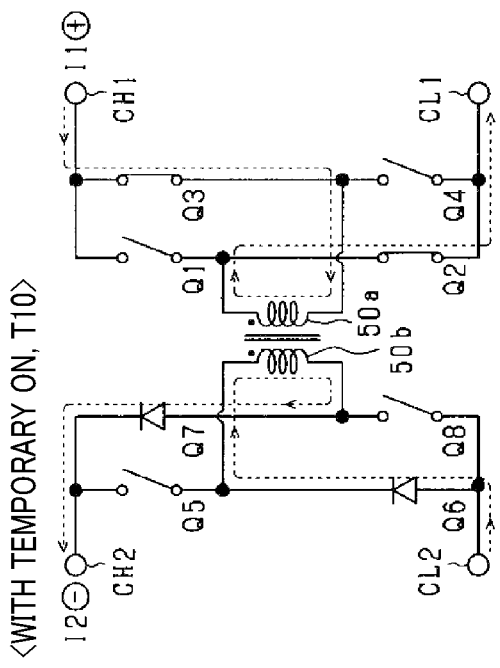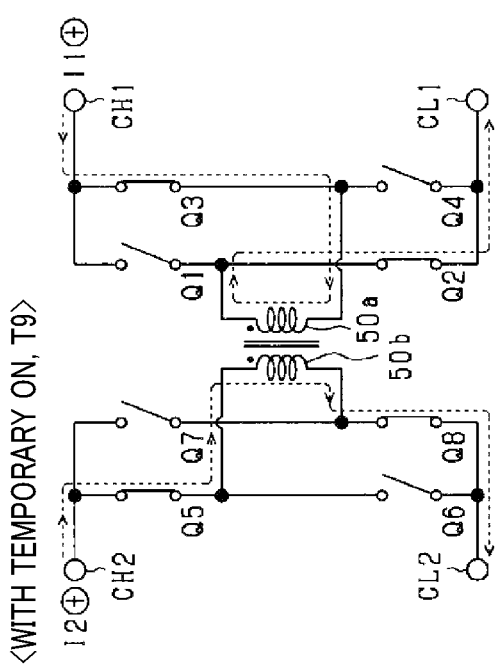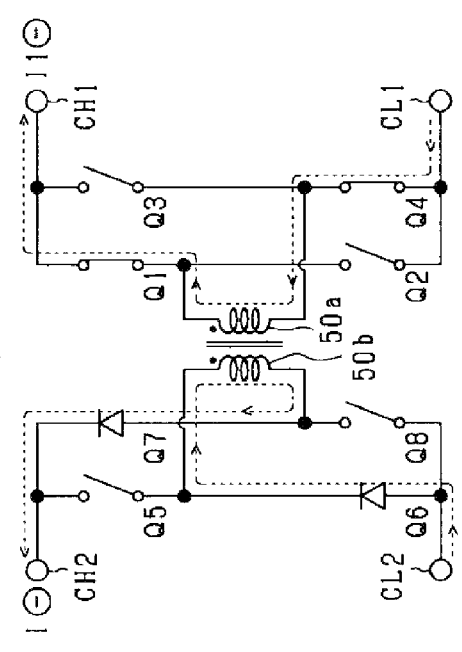

ELECTRIC POWER CONVERSION APPARATUS

CROSS-REFERENCE TO RELATED APPLICATION

This application is the U.S. bypass application of International Application No. PCT/JP2020/040535 filed on Oct. 28, 2020, which designated the U.S. and claims priority to Japanese Patent Application No. 2019-197370 filed on Oct. 30, 2019, the contents of both of which are incorporated herein by reference.

TECHNICAL FIELD

The present disclosure relates to an electric power conversion apparatus.

BACKGROUND

Conventionally, there has been performed a control for converting electric energy from a storage battery into thermal energy to raise the temperature of a temperature-rise target element. JP 3451141 B discloses an electric power conversion apparatus that raises the temperature of a storage battery as a temperature-rise target element using a heat exchange fluid heated by an electric heater.

SUMMARY

An aspect of the present disclosure is an electric power conversion apparatus that has an input terminal, an output terminal, and a switch unit, and turns on and off the switch unit to transfer electric power from an electric storage unit connected to the input terminal to a power supply target connected to the output terminal. In the electric power conversion apparatus, the switch unit has a characteristic of, when reverse conduction current flows in the switch unit, causing a larger conduction loss in an off state than in an on state. The electric power conversion apparatus includes: a determination unit that determines whether there is a request for increasing an amount of heat generation due to the electric power transfer; and a control unit that, when it is determined that there is the request for increasing the amount of heat generation, turns off the switch unit in which the reverse conduction current flows during the electric power transfer and, when it is determined that there is no request for increasing the amount of heat generation, turns on the switch unit in which the reverse conduction current flows during the electric power transfer.

BRIEF DESCRIPTION OF THE DRAWINGS

The above features of the present disclosure will be made clearer by the following detailed description, given referring to the appended drawings. In the accompanying drawings:

FIG. 4 is a functional block diagram of the control unit in the heat generation mode;

FIGS. 5A and 5B are timing charts illustrating transitions of the operational states of the switches in the heat generation mode;

FIGS. 7A to 7E are timing charts illustrating transitions of the operational states of the switches and current waveforms in the normal mode and the heat generation mode;

FIGS. 9A to 9D are diagrams illustrating current paths in switching patterns in the heat generation mode;

FIGS. 14A to 14G are timing charts illustrating transitions of operational states of switches in an electric power conversion apparatus and transitions of current waveforms according to a fourth embodiment;

FIGS. 15A to 15C are diagrams illustrating current paths in switching patterns with temporary turn-ons;

DETAILED DESCRIPTION OF THE PREFERRED EMBODIMENTS

Figure 1:
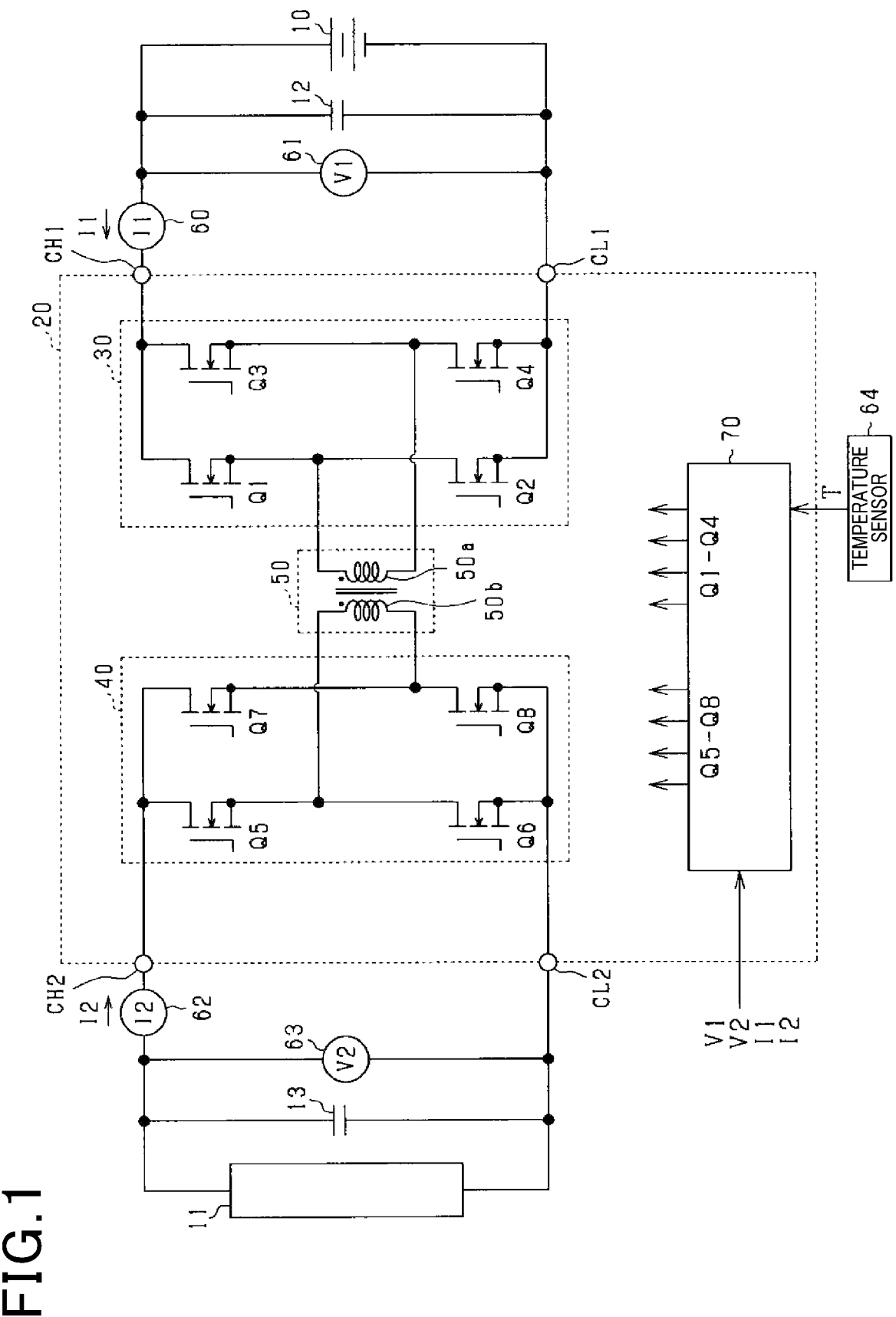
FIG. 1 is a configuration diagram of an electric power conversion apparatus according to a first embodiment.

There is a concern that adding an electric heater for raising the temperature of a storage battery to an electric power conversion apparatus may lead to upsizing of the electric power conversion apparatus.

The present disclosure has been devised in view of the above problem. A main object of the present disclosure is to provide an electric power conversion apparatus that can be downsized.

Hereinafter, a solution to the above problem and its advantageous effects will be described.

To solve the above problem, the present disclosure is an electric power conversion apparatus that has an input terminal, an output terminal, and a switch unit, and turns on and off the switch unit to transfer electric power from an electric storage unit connected to the input terminal to a power supply target connected to the output terminal. In the electric power conversion apparatus, the switch unit has a characteristic of, when reverse conduction current flows in the switch unit, causing a larger conduction loss in an off state than in an on state. The electric power conversion apparatus includes: a determination unit that determines whether there is a request for increasing an amount of heat generation due to the electric power transfer; and a control unit that, when it is determined that there is the request for increasing the amount of heat generation, turns off the switch unit in which the reverse conduction current flows during the electric power transfer and, when it is determined that there is no request for increasing the amount of heat generation, turns on the switch unit in which the reverse conduction current flows during the electric power transfer.

In the present disclosure, the switch unit is turned on and off when electric power is transferred from the electric storage unit connected to the input terminal to the power supply target connected to the output terminal. At this time, a conduction loss is generated by the flow of the reverse conduction current into the switch unit, and heat is generated by the conduction loss. The utilization of the heat eliminates the need for a heat generation apparatus for raising the temperature of the temperature-rise target element. Even if a heat generation apparatus is provided, the apparatus can be reduced in size. Thus, according to the present disclosure, it is possible to achieve downsizing of the electric power conversion apparatus.

The switch unit in the present disclosure has the characteristic of, when reverse conduction current flows in the switch unit, causing a larger conduction loss in the off state than in the on state when. Focusing on this characteristic, in the present disclosure, if it is determined that there is a request for increasing the amount of heat generation due to electric power transfer, the switch unit in which the reverse conduction current flows during the electric power transfer is turned off, and when it is determined that there is no request for increasing the amount of heat generation, the switch unit in which the reverse conduction current flows during the electric power transfer is turned on. This allows the conduction loss generated in the switch unit to be larger with the request for increasing than without the request for increasing. As a result, it is possible to increase the amount of heat generated by the electric power conversion apparatus.

First Embodiment

Hereinafter, a first embodiment of an electric power conversion apparatus according to the present disclosure will be described with reference to the drawings. The electric power conversion apparatus in the present embodiment is mounted in an electrically powered vehicle such as a plug-in hybrid automobile or an electric automobile.

As illustrated in FIG. 1, the electric power conversion system includes a storage battery 10 as an electric storage unit, a power supply target 11, a first capacitor 12, a second capacitor 13, and an electric power conversion apparatus 20.

The storage battery 10 supplies electric power to the power supply target 11 via the electric power conversion apparatus 20. The storage battery 10 is a rechargeable secondary battery, and is, for example, a lithium-ion storage battery. The power supply target 11 includes at least one of a low-voltage storage battery with a lower output voltage than that of the storage battery 10 and an electric load. The low-voltage storage battery is, for example, a lead storage battery. The electric load is, for example, a head lamp.

The electric power conversion apparatus 20 includes a first high-potential terminal CH1, a first low-potential terminal CL1, a first full-bridge circuit 30, a second high-potential terminal CH2, a second low-potential terminal CL2, a second full-bridge circuit 40, and a transformer 50. In the present embodiment, the first high-potential terminal CH1 and the first low-potential terminal CL1 correspond to a pair of input terminals, and the second high-potential terminal CH2 and the second low-potential terminal CL2 correspond to a pair of output terminals. The first full-bridge circuit 30 corresponds to a conversion circuit.

The first full-bridge circuit 30 includes first to fourth switches Q1 to Q4. The second full-bridge circuit 40 includes fifth to eighth switches Q5 to Q8. In the present embodiment, the switches Q1 to Q8 are N-channel MOSFETs that have drains, sources, and gates. In the on state, each of the switches Q1 to Q8 allows distribution of current from one of the drain and source to the other. In the off state, each of the switches Q1 to Q8 allows reverse conduction of current from the source to the drain via built-in body diodes. In the present embodiment, the fifth to eighth switches Q5 to Q8 correspond to a switch unit. In the present embodiment, the drains correspond to a high-potential terminal, and the sources correspond to a low-potential terminal.

In the first full-bridge circuit 30, the first high-potential terminal CH1 is connected to the drains of the first switch Q1 and third switch Q3. The drain of the second switch Q2 is connected to the source of the first switch Q1, and the drain of the fourth switch Q4 is connected to the source of the third switch Q3. The first low-potential terminal CL1 is connected to the sources of the second switch Q2 and fourth switch Q4. The first low-potential terminal CL1 is connected to the first high-potential terminal CH1 via the first capacitor 12. A positive terminal of the storage battery 10 is connected to the first high-potential terminal CH1, and the first low-potential terminal CL1 is connected to a negative terminal of the storage battery 10.

In the second full-bridge circuit 40, the second high-potential terminal CH2 is connected to the drains of the fifth switch Q5 and seventh switch Q7. The drain of the sixth switch Q6 is connected to the source of the fifth switch Q5, and the drain of the eighth switch Q8 is connected to the source of the seventh switch Q7. The second low-potential terminal CL2 is connected to the sources of the sixth switch Q6 and eighth switch Q8. The second low-potential terminal CL2 is connected to the second high-potential terminal CH2 via the second capacitor 13. The second low-potential terminal CL2 is connected to the second high-potential terminal CH2 via the power supply target 11.

The transformer 50 has a first coil 50a and a second coil 50b. The source of the first switch Q1 and the drain of the second switch Q2 are connected to a first end of the first coil 50a. The source of the third switch Q3 and the drain of the fourth switch Q4 are connected to a second end of the first coil 50a. The source of the fifth switch Q5 and the drain of the sixth switch Q6 are connected to a first end of the second coil 50b. The source of the seventh switch Q7 and the drain of the eighth switch Q8 are connected to a second end of the second coil 50b.

The first coil 50a and the second coil 50b are magnetically coupled to each other. If the potential of the first end to the second end of the first coil 50a is high, an inductive voltage is generated at the second coil 50b such that the potential of the second end is higher than the potential of the first end. On the other hand, if the potential of the second end to the first end of the first coil 50a is high, an inductive voltage is generated at the second coil 50b such that the potential of the second end is higher than the potential of the first end.

The electric power conversion system includes a first current sensor 60, a first voltage sensor 61, a second current sensor 62, a second voltage sensor 63, and a temperature sensor 64. The first current sensor 60 detects a first current I1 flowing through the first high-potential terminal CH1, and the first voltage sensor 61 detects a first voltage V1 that is an inter-terminal voltage between the first high-potential terminal CH1 and the first low-potential terminal CL1. The first current I1 here is positive when a discharge current flows in the storage battery 10, and is negative when a charging current flows in the storage battery 10.

The second current sensor 62 detects a second current I2 flowing through the second high-potential terminal CH2, and the second voltage sensor 63 detects a second voltage V2 that is an inter-terminal voltage between the second high-potential terminal CH2 and the second low-potential terminal CL2. The second current I2 here is positive when the current flows in a direction from the second high-potential terminal CH2 to the drains of the fifth switch Q5 and seventh switch Q7, and is negative when the current flows in the opposite direction.

The temperature sensor 64 detects an environmental temperature T. In the present embodiment, the environmental temperature T is the temperature of a temperature-rise target element. In the present embodiment, the temperature-rise target element is, for example, the electric power conversion apparatus 20.

The detection values I1, V1, I2, V2, and T are input into a control unit 70 included in the electric power conversion apparatus 20. The control unit 70 outputs drive signals to the gates of the switches Q1 to Q8 to turn on and off the switches Q1 to Q8, based on the detection values I1, V1, I2, V2, and T.

Next, a temperature-rise control performed in the present embodiment will be described. In the present embodiment, if the environmental temperature T is higher than a preset temperature, a normal mode is set. On the other hand, if the environmental temperature T is equal to or lower than the preset temperature, a heat generation mode is set and the temperature-rise control is performed.

Figure 2:
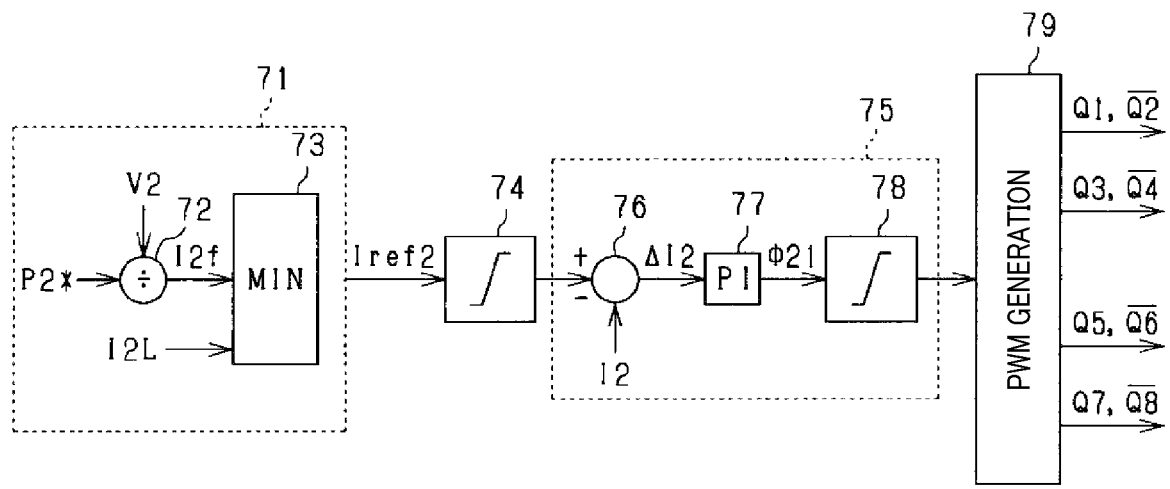
FIG. 2 is a functional block diagram of a control unit in a normal mode.

FIG. 2 illustrates a block diagram of control performed by the control unit 70 in the normal mode.

The control unit 70 includes a command current setting unit 71. The command current setting unit 71 includes a current calculation unit 72 and a minimum value selection unit 73.

The current calculation unit 72 calculates a command current I2$f$ by dividing an electric power command value P2* by the second voltage V2 that is the voltage detected by the second voltage sensor 63. The definitions of the signs of the command current I2$f$ are identical to the definitions of the signs of the second current I2.

The minimum value selection unit 73 selects a final command current Iref2 that is the smaller one of the command current I2$f$ calculated by the current calculation unit 72 and a current limit value I2L. The current limit value I2L is set to protect the electric power conversion system from overcurrent.

The command current Iref2 output from the minimum value selection unit 73 has an upper limit value or lower limit value limited by a first limiter 74.

The control unit 70 includes a current controller 75. The current controller 75 includes a current deviation calculation unit 76, a feedback control unit 77, and a second limiter 78. The current deviation calculation unit 76 calculates a current deviation ΔI2 by subtracting the second current I2 that is the current detected by the second current sensor 62 from the command current Iref2 output from the first limiter 74.

The feedback control unit 77 calculates an inter-circuit phase φ21 as the amount of an operation for feeding the calculated current deviation ΔI2 back to zero. In the present embodiment, proportional-plus-integral control is used as the feedback control. The feedback control used by the feedback control unit 77 is not limited to proportional-plus-integral control, and may be, for example, proportional-plus-integral-plus-derivative control.

The inter-circuit phase φ21 calculated by the feedback control unit 77 has an upper limit value or lower limit value set by the second limiter 78 and input into a PWM generation unit 79. In the present embodiment, the inter-circuit phase φ21 is limited in a range of 0° to a predetermined phase. In the range, the greater the value of the phase, the larger the transferred electric power from the storage battery 10 to the power supply target 11 becomes.

The PWM generation unit 79 generates drive signals for the switches Q1 to Q8 based on the inter-circuit phase φ21, and outputs the drive signals to the gates of the switches Q1 to Q8.

Figure 3A:
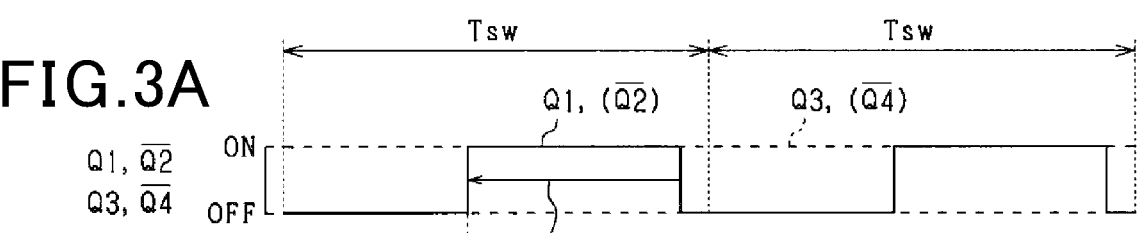
FIGS. 3A and 3B are timing charts illustrating transitions of operational states of switches in the normal mode.
Figure 3B:
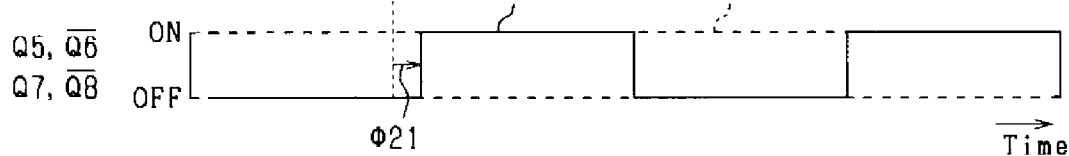

FIGS. 3A and 3B illustrate transitions of operational states of the switches Q1 to Q8 in the normal mode. FIG. 3A illustrates the transitions of the operational states of the first to fourth Q1 to Q4, and FIG. 3B illustrates the transitions of the operational states of the fifth to eighth switches Q5 to Q8.

The solid line in FIG. 3A illustrates the transition of the operational state of the first switch Q1. The operational state of the second switch Q2 is the reverse of that of the first switch Q1. The dashed line in FIG. 3A illustrates the transition of the operational state of the third switch Q3. The operational state of the fourth switch Q4 is the reverse of that of the third switch Q3. For example, referring to FIG. 3A, the on period of the first switch Q1 is the off period of the second switch Q2.

The solid line in FIG. 3B illustrates the transition of the operational state of the fifth switch Q5. The operational state of the sixth switch Q6 is the reverse of that of the fifth switch Q5. The dashed line in FIG. 3B illustrates the transition of the operational state of the seventh switch Q7. The operational state of the eighth switch Q8 is the reverse of that of the seventh switch Q7. For example, referring to FIG. 3B, the on period of the fifth switch Q5 is the off period of the sixth switch Q6.

The switches Q1 to Q8 are identical in one switching cycle Tsw. The phase difference between the timing for turning off the first switch Q1 and the timing for switching off the third switch Q3 is set as an inter-leg phase φ1. In the present embodiment, the inter-leg phase φ1 is positive when the timing for switching off the third switch Q3 is moved forward with respect to the timing for switching off the first switch Q1. For example, in FIG. 3A, the inter-leg phase φ1 is set to 180°, where the one switching cycle Tsw is 360°.

The phase difference between the timing for switching on the first switch Q1 and the timing for switching on the fifth switch Q5 is set as an inter-circuit phase φ21. In the present embodiment, the inter-circuit phase φ21 is positive when the timing for switching on the fifth switch Q5 is moved behind the timing for switching on the first switch Q1. For example, the inter-circuit phase φ21 is positive in FIGS. 3A and 3B.

FIG. 4 illustrates a block diagram of control performed by the control unit 70 in the heat generation mode. In the heat generation mode as well, the command current setting unit 71 sets the command current Iref2, and the current controller 75 performs feedback control. Unlike in the normal mode, in the heat generation mode, the inter-leg phase φ1 is calculated as the amount of an operation for feeding a current deviation ΔI2 calculated from the command current Iref2 and the second current I2 back to zero. The inter-leg phase φ1 has an upper limit value or lower limit value set by the second limiter 78 and input into the PWM generation unit 79.

FIGS. 5A and 5B illustrate transitions of operational states of the switches Q1 to Q8 in the heat generation mode. FIGS. 5A and 5B correspond to FIGS. 3A and 3B described above. The control unit 70 turns on and off the first to fourth switches Q1 to Q4 based on the inter-leg phase φ1 as illustrated in FIG. 5A, and fixes the fifth to eighth switches Q5 to Q8 in the off state as illustrated in FIG. 5B.

Figure 6:
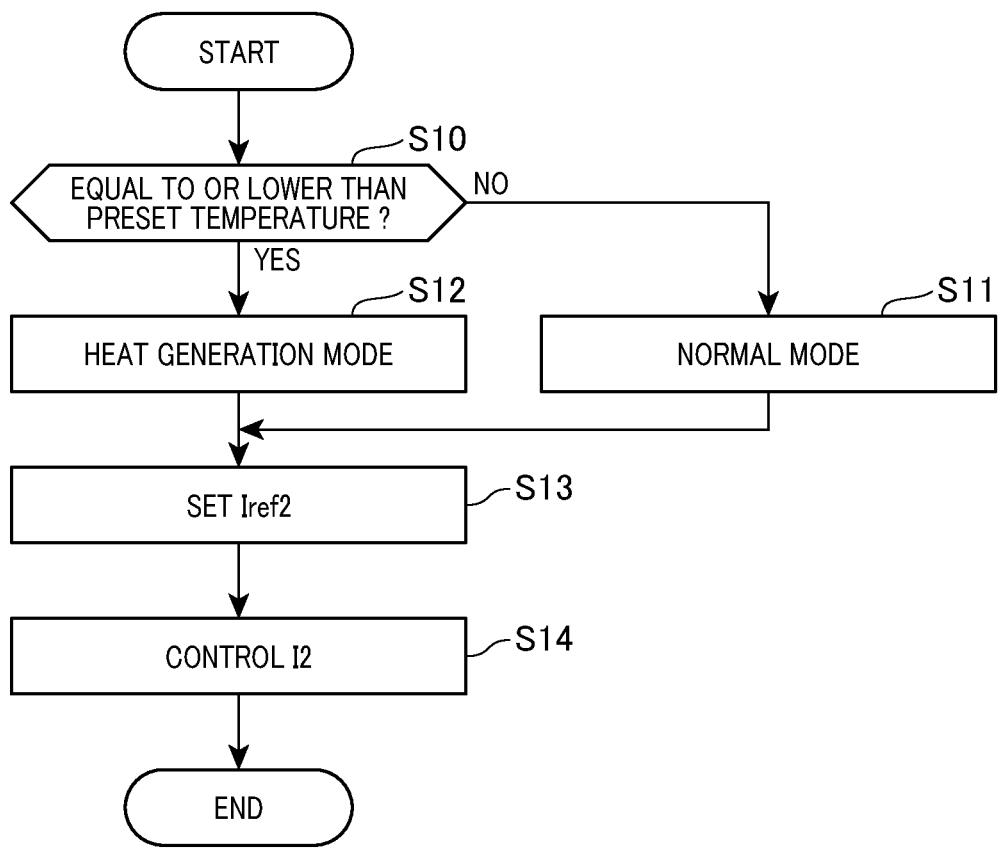
FIG. 6 is a flowchart of a processing procedure by the control unit.

FIG. 6 illustrates a procedure of processing executed by the control unit 70. This processing is repeatedly executed, for example, in a predetermined control cycle.

In step S10, the control unit 70 determines whether the environmental temperature T is equal to or lower than a preset temperature. In the present embodiment, step S10 corresponds to a determination unit.

If the negative determination is made in step S10, the processing moves to step S11 where the control unit 70 sets the control mode to the normal mode. In the normal mode, the control unit 70 turns on and off the switches Q1 to Q8 to transfer electric power between the storage battery 10 and the power supply target 11. In the present embodiment, the product of the first voltage V1 and the number of windings of the first coil 50a is larger than the product of the second voltage V2 and the number of windings of the second coil 50b. That is, this processing causes the electric power to transfer from the storage battery 10 to the power supply target 11.

If the affirmative determination is made in step S10, the processing moves to step S12 where the control unit 70 sets the control mode to the heat generation mode. In the heat generation mode, the control unit 70 turns on and off the switches Q1 to Q4 of the first full-bridge circuit 30 and fixes the switches Q5 to Q8 of the second full-bridge circuit 40 in the off state. In the heat generation mode as well, electric power is transferred from the storage battery 10 to the power supply target 11.

In step S13, the command current setting unit 71 sets the command current Iref2.

In step S14, the control unit 70 controls the switches Q1 to Q8 so that the second current I2 is controlled to the command current Iref2.

FIGS. 7A to 7E illustrate transitions of the operational states of the switches Q1 to Q8, transitions of current waveforms in the normal mode and the heat generation mode, and others. FIG. 7A illustrates the transitions of the operational states of the first to fourth switches Q1 to Q4. FIG. 7B illustrates the transitions of the operational states of the fifth to eighth switches Q5 to Q8.

FIG. 7C illustrates the transitions of the first current I1 and second current I2. FIG. 7D illustrates first electric power P1, second electric power P2, and electric power loss P1+P2. The first electric power P1 is a time average value of electric power supplied from the storage battery 10 to the first full-bridge circuit 30, and the second electric power P2 is a time average value of electric power supplied from the second full-bridge circuit 40 to the power supply target 11. If the first electric power is positive, electricity is discharged from the storage battery 10. If the second electric power P2 is negative, electric power is supplied to the power supply target 11. Therefore, the sum P1+P2 of the first electric power P1 and second electric power P2 is electric power loss. If the electric power loss P1+P2 is positive, the electric energy is converted into heat energy, thereby resulting in heat generation. FIG. 7E is an enlarged view of the vertical axis of the electric power loss P1+P2 in FIG. 7D. The vertical axes in the normal mode and the heat generation mode in FIG. 7E are the same in scale and used to compare the magnitudes of the electric power loss P1+P2 in the normal mode and the heat generation mode.

Hereinafter, temperature-rise controls in the normal mode and the heat-generation mode of the present embodiment will be described with reference to FIGS. 7 to 9.

In the normal mode of the present embodiment, the inter-leg phase φ1 is set to 180°. The inter-circuit phase φ21 is calculated as a value in a range of 0° to a predetermined phase for feedback control of the second current I2 to the command current Iref2.

As illustrated in FIGS. 7A and 7B, in the normal mode of the present embodiment, first to fourth periods T1 to T4 appear in one switching cycle Tsw. The first period T1 is a period during which the second, third, sixth, and seventh switches Q2, Q3, Q6, and Q7 are turned on, and the first, fourth, fifth, and eighth switches Q1, Q4, Q5, and Q8 are turned off. The second period T2 is a period during which the first, fourth, sixth, and seventh switches Q1, Q4, Q6, and Q7 are turned on, and the second, third, fifth, and eighth switches Q2, Q3, Q5, and Q8 are turned off.

The third period T3 is a period during which the first, fourth, fifth, and eighth switches Q1, Q4, Q5, and Q8 are turned on, and the second, third, sixth, and seventh switches Q2, Q3, Q6, and Q7 are turned off. The fourth period T4 is a period during which the second, third, fifth, and eighth switches Q2, Q3, Q5, and Q8 are turned on, and the first, fourth, sixth, and seventh switches Q1, Q4, Q6, and Q7 are turned off.

Figure 8B:
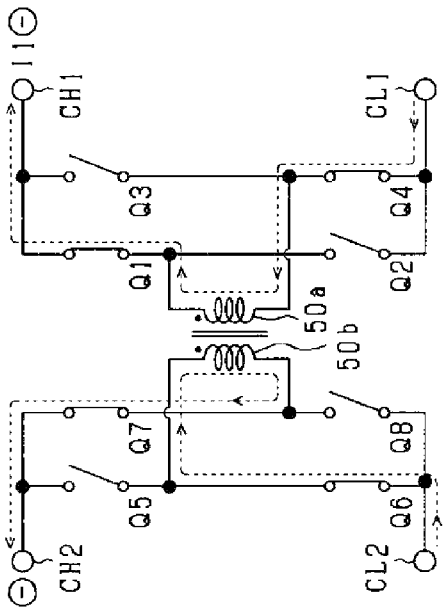
FIGS. 8A to 8D are diagrams illustrating current paths in switching patterns in the normal mode.
Figure 8D:
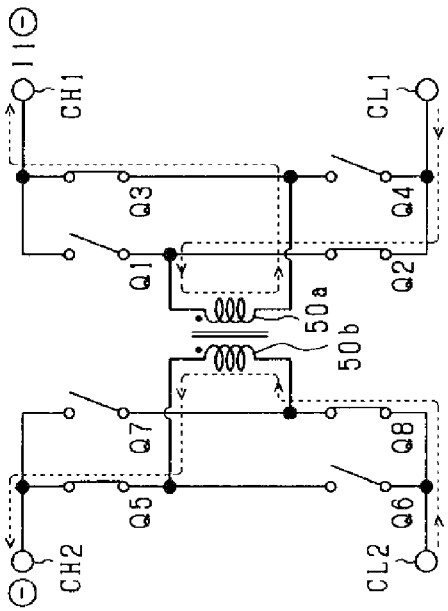
Figure 8A:
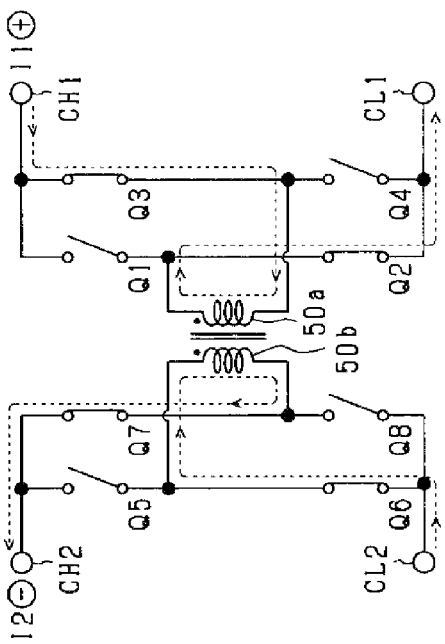

FIG. 8A illustrates current paths in the first period T1. In the first full-bridge circuit 30, the current path is formed including the first high-potential terminal CH1, the third switch Q3, the first coil 50a, the second switch Q2, and the first low-potential terminal CL1. On the other hand, in the second full-bridge circuit 40, the current path is formed including the second low-potential terminal CL2, the sixth switch Q6, the second coil 50b, the seventh switch Q7, and the second high-potential terminal CH2.

Accordingly, as illustrated in the normal mode of FIG. 7C, in the first period T1, the first current I1 gradually increases in the positive direction, whereas the second current I2 gradually increases in the negative direction.

FIG. 8B illustrates current paths in the second period T2. In the first full-bridge circuit 30, the current path is formed including the first low-potential terminal CL1, the fourth switch Q4, the first coil 50a, the first switch Q1, and the first high-potential terminal CH1. On the other hand, in the second full-bridge circuit 40, the same current path as that in the first period T1 is formed.

In the second period T2, the first coil 50a has a temporarily induced voltage with which its first end is higher in potential than its second end. Thus, as illustrated in the normal mode of FIG. 7C, the sign of the first current I1 is negative and its absolute value gradually decreases. On the other hand, the second coil 50b has a temporarily induced voltage with which its second end is higher in potential than its first end. Thus, the sign of the second current I2 remains negative and its absolute value gradually decreases.

Figure 8C:
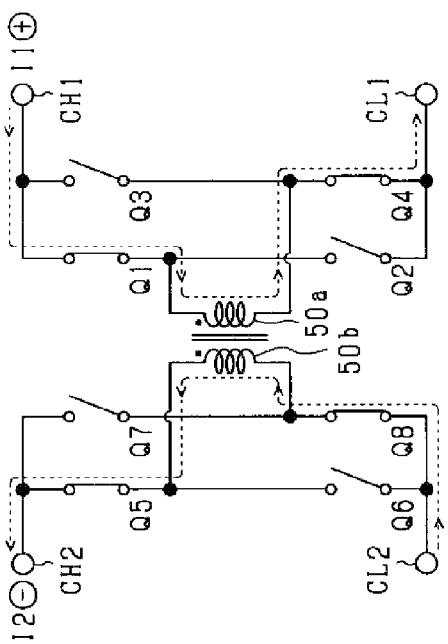

FIG. 8C illustrates current paths in the third period T3. In the first full-bridge circuit 30, the current path is formed including the first high-potential terminal CH1, the first switch Q1, the first coil 50a, the fourth switch Q4, and the first low-potential terminal CL1. On the other hand, in the second full-bridge circuit 40, the current path is formed including the second low-potential terminal CL2, the eighth switch Q8, the second coil 50b, the fifth switch Q5, and the second high-potential terminal CH2.

Accordingly, as illustrated in the normal mode of FIG. 7C, in the third period T3, the first current I1 gradually increases in the positive direction, whereas the second current I2 gradually increases in the negative direction.

FIG. 8D illustrates current paths in the fourth period T4. In the first full-bridge circuit 30, the current path is formed including the first low-potential terminal CL1, the second switch Q2, the first coil 50a, the third switch Q3, and the first high-potential terminal CH1. On the other hand, in the second full-bridge circuit 40, the same current path as that in the third period T3 is formed.

In the fourth period T4, the first coil 50a has a temporarily induced voltage with which its second end is higher in potential than its first end. Thus, as illustrated in the normal mode of FIG. 7C, the sign of the first current I1 is negative and its absolute value gradually decreases. On the other hand, the second coil 50b has a temporarily induced voltage with which its first end is higher in potential than its second end. Thus, the sign of the second current I2 remains negative and its absolute value gradually decreases.

FIG. 7C illustrates a time average value I1ave of the first current I1 and a time average value I2ave of the second current I2 in the normal mode in the first to fourth periods T1 to T4 by dashed lines. The first current average value I1ave is a positive value, and the second current average value I2ave is a negative value.

As illustrated in the normal mode of FIG. 7D, the first electric power P1 takes a positive value and the second electric power P2 takes a negative value. This means that electric power is transferred from the storage battery 10 to the power supply target 11 in the first to fourth periods T1 to T4. As illustrated in the normal mode of FIG. 7E, this transfer of electric power causes a power loss in each of the switches Q1 to Q8, and thus the electric power loss P1+P2 takes a positive value.

Subsequently, the temperature-rise control in the heat generation mode of the present embodiment will be described. In the heat generation mode of the present embodiment, the inter-leg phase φ1 is set to a value in the range of no a predetermined phase for feedback control of the second current I2 to the command current Iref2. Limiting the inter-leg phase φ1 in the range of 0° to a predetermined phase prevents electric power transferrable from the storage battery 10 to the power supply target 11 from reducing excessively because of setting the inter-leg phase φ1 to too large a value.

As illustrated in FIG. 7A, in the heat generation mode of the present embodiment, fifth to eight periods T5 to T8 appear in one switching cycle Tsw. The fifth period T5 is a period during which the second and third switches Q2 and Q3 are turned on, and the first, fourth, fifth, sixth, seventh, and eighth switches Q1, Q4, Q5, Q6, Q7, and Q8 are turned off. The sixth period T6 is a period during which the first and third switches Q1 and Q3 are turned on, and the second, fourth, fifth, sixth, seventh, and eighth switches Q2, Q4, Q5, Q6, Q7, and Q8 are turned off.

The seventh period T7 is a period during which the first and fourth switches Q1 and Q4 are turned on, and the second, third, fifth, sixth, seventh, and eighth switches Q2, Q3, Q5, Q6, Q7, and Q8 are turned off. The eighth period T8 is a period during which the second and fourth switches Q2 and Q4 are turned on, and the first, third, fifth, sixth, seventh, and eighth switches Q1, Q3, Q5, Q6, Q7, and Q8 are turned off.

FIG. 9A illustrates current paths in the fifth period T5. In the first full-bridge circuit 30, the current path is formed including the first high-potential terminal CH1, the third switch Q3, the first coil 50a, the second switch Q2, and the first low-potential terminal CL1. On the other hand, in the second full-bridge circuit 40, the current path is formed including the second low-potential terminal CL2, the sixth switch Q6, the second coil 50b, the seventh switch Q7, and the second high-potential terminal CH2. In this case, reverse conduction current flows in body diodes built in the sixth switch Q6 and seventh switch Q7.

Accordingly, as illustrated in the heat generation mode of FIG. 7C, in the fifth period T5, the first current I1 gradually increases in the positive direction, whereas the second current I2 gradually increases in the negative direction.

FIG. 9B illustrates current paths in the sixth period T6. In the first full-bridge circuit 30, the current path is formed including the first switch Q1, the third switch Q3, and the first coil 50a. On the other hand, in the second full-bridge circuit 40, the same current path as that in the fifth period T5 is formed.

In the sixth period T6, the first coil 50a is not connected to the first low-potential terminal CL1, and thus the first current I1 is zero as illustrated in the heat generation mode of FIG. 7C. In the first full-bridge circuit 30, the first coil 50a has a temporarily induced voltage with which its first end is higher in potential than its second end. Accordingly, the second coil 50b has a temporarily induced voltage with which its second end is higher in potential than its first end. Thus, the sign of the second current I2 remains negative and its absolute value gradually decreases.

FIG. 9C illustrates current paths in the seventh period T7. In the first full-bridge circuit 30, the current path is formed including the first high-potential terminal CH1, the first switch Q1, the first coil 50a, the fourth switch Q4, and the first low-potential terminal CL1. On the other hand, in the second full-bridge circuit 40, the current path is formed including the second low-potential terminal CL2, the eighth switch Q8, the second coil 50b, the fifth switch Q5, and the second high-potential terminal CH2. In this case, reverse conduction current flows in body diodes built in the fifth switch Q5 and eighth switch Q8.

Accordingly, as illustrated in the heat generation mode of FIG. 7C, in the seventh period T7, the first current I1 gradually increases in the positive direction, whereas the second current I2 gradually increases in the negative direction.

FIG. 9D illustrates current paths in the eighth period T8. In the first full-bridge circuit 30, the current path is formed including the second switch Q2, the first coil 50a, and the fourth switch Q4. On the other hand, in the second full-bridge circuit 40, the same current path as that in the seventh period T7 is formed.

In the eighth period T8, the first coil 50a is not connected to the first high-potential terminal CH1, and thus the first current I1 is zero as illustrated in the heat generation mode of FIG. 7C. In the first full-bridge circuit 30, the first coil 50a has a temporarily induced voltage with which its second end is higher in potential than its first end. Accordingly, the second coil 50b has a temporarily induced voltage due to which its first end is higher in potential than its second end. Thus, the sign of the second current I2 remains negative and its absolute value gradually decreases.

FIG. 7C illustrates the time average value I1ave of the first current I1 and the time average value I2ave of the second current I2 in the fifth to eighth periods T5 to T8 in the heat generation mode by dashed lines. The first current average value I1ave is a positive value, and the second current average value I2ave is a negative value.

As illustrated in the heat generation mode of FIG. 7D, the first electric power P1 takes a positive value and the second electric power P2 takes a negative value. This means that electric power is transferred from the storage battery 10 to the power supply target 11 in the fifth to eighth periods T5 to T8. This transfer of electric power causes a power loss in each of the switches Q1 to Q8, and thus the electric power loss P1+P2 takes a positive value.

As illustrated in the normal mode and the heat generation mode of FIG. 7E, the value of the electric power loss P1+P2 in the heat generation mode is larger than the value of the electric power loss P1+P2 in the normal mode. This is because a voltage drop is larger at the reverse conduction of current to the fifth to eighth switches Q5 to Q8 in the off state in the heat generation mode than at the reverse conduction of current to the fifth to eighth switches Q5 to Q8 in the on state in the normal mode.

According to the present embodiment described above in detail, the following advantageous effects can be obtained.

In the present embodiment, the switches Q1 to Q8 are turned on and off when power is transferred from the storage battery 10 to the power supply target 11. At this time, a conduction loss occurs along with the flow of the reverse conduction current to the fifth to eighth switches Q5 to Q8, and heat is generated due to the conduction loss. The use of the heat eliminates the need to provide a heat generator for raising the temperature of the temperature-rise target element. Even in the case of providing a heat generator, it is possible to reduce the size of the heat generator. Thus, according to the present embodiment, it is possible to achieve downsizing of the electric power conversion apparatus 20.

The fifth to eighth switches Q5 to Q8 in the present embodiment have the characteristic of, when reverse conduction current flows thereto, having a larger conduction loss in the off state than in the on state. Focusing on this characteristic, in the present embodiment, the fifth to eighth switches Q5 to Q8 are turned off in the heat generation mode, and the fifth to eighth switches Q5 to Q8 are turned on and off in the normal mode. Accordingly, the conduction losses caused in the fifth to eighth switches Q5 to Q8 become larger in the heat generation mode than in the normal mode. As a result, it is possible to increase the amount of heat generated by the electric power conversion apparatus 20.

Modification Examples of First Embodiment

The switches Q1 to Q8 are not limited to N-channel MOSFETs, and may be IGBTs. In this case, the high-potential terminals are collectors, and the low-potential terminals are emitters. In the case of using IGBTs, the first full-bridge circuit 30 and the second full-bridge circuit 40 include freewheel diodes that are connected in inverse parallel to the switches Q1 to Q8. In this case, the pairs of switches and freewheel diodes correspond to a switch unit.

Any circuit other than the first full-bridge circuit 30 may be used as long as it can apply an alternating voltage to the first coil 50a.

Second Embodiment

Hereinafter, a second embodiment will be described with reference to the drawings, centering on differences from the first embodiment. In the first embodiment, the control unit 70 controls the second current I2 to the command current Iref2. Differently from this, in the present embodiment, a control unit 70 controls a second voltage V2 to a command voltage V2* in a heat generation mode.

Figure 10:
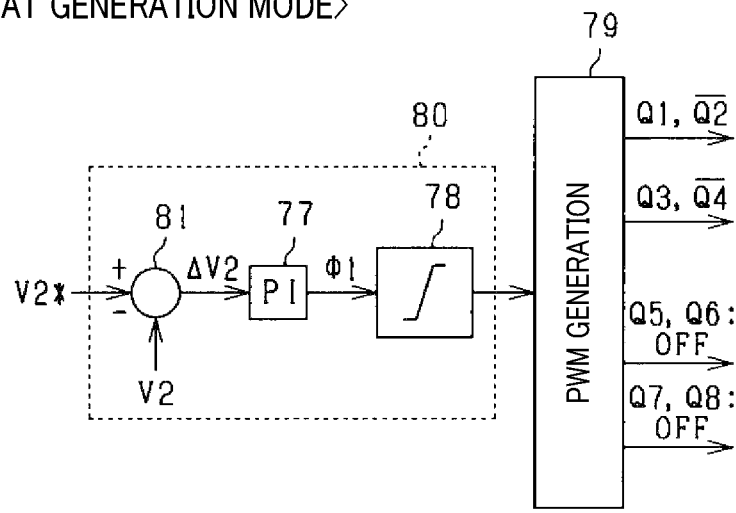
FIG. 10 is a functional block diagram of a control unit in a heat generation mode according to a second embodiment.

FIG. 10 is a block diagram of control performed by the control unit 70 in the heat generation mode of the present embodiment. The control unit 70 includes a voltage controller 80. The voltage controller 80 includes a voltage deviation calculation unit 81, a feedback control unit 77, and a second limiter 78.

The voltage deviation calculation unit 81 subtracts the second voltage V2 that is the voltage detected by a second voltage sensor 63 from the command voltage V2* to calculate a voltage deviation $\Delta V2$. In the present embodiment, the value of the command voltage V2* in the heat generation mode is set to $V\beta$. The value of $V\beta$ is smaller than a value $V\alpha$ of the command voltage V2* in a normal mode.

The feedback control unit 77 calculates an inter-leg phase $\varphi 1$ as the amount of an operation for feeding the calculated voltage deviation $\Delta V2$ back to zero.

The inter-leg phase $\varphi 1$ calculated by the feedback control unit 77 has an upper limit value or lower limit value set by the second limiter 78 and input into a PWM generation unit 79.

The PWM generation unit 79 generates drive signals for the switches Q1 to Q8 based on the inter-leg phase $\varphi 1$, and outputs the drive signals to the gates of the switches Q1 to Q8.

FIG. 11 illustrates transitions of operational states of the switches Q1 to Q8 and current waves in cases where the value of the command voltage V2* is set to V2*=$V\alpha$ and V2*=$V\beta$. FIGS. 11A and 11B correspond to FIGS. 7A and 7B described above. FIG. 11C illustrates the first voltage V1 and the second voltage V2. The vertical axes are identical in scale between the case of V2*=$V\alpha$ and the case of V2*=$V\beta$. FIGS. 11D, 11E, and 11F correspond to FIGS. 7C, 7D, and 7E described above. Referring to FIG. 11F, the vertical axes are identical in scale between the case of V2*=$V\alpha$ and the case of V2*=$V\beta$, and are used for comparison the magnitudes of the electric power loss P1+P2.

Figure 11A:
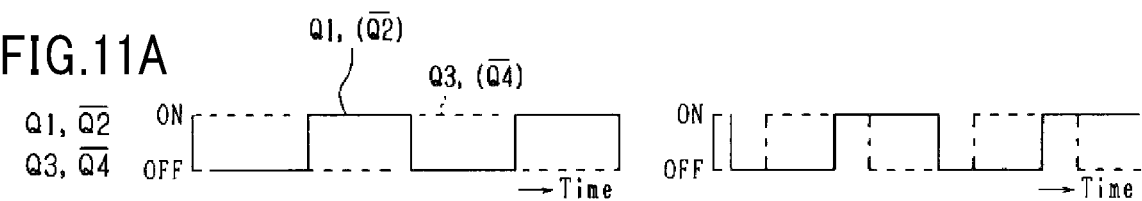
FIGS. 11A to 11F are timing charts illustrating transitions of current waveforms with different command voltages.
Figure 11B:
Figure 11C:
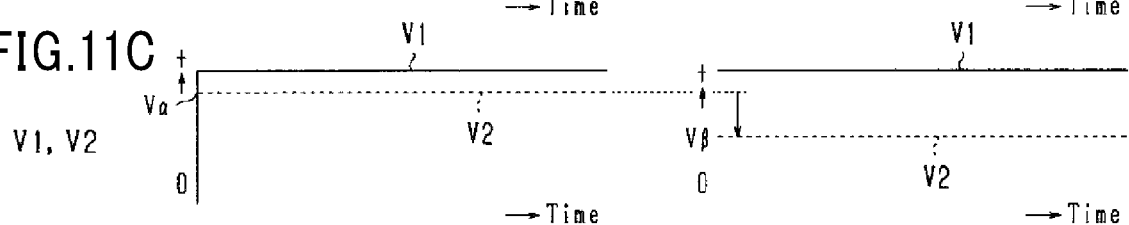
Figure 11D:
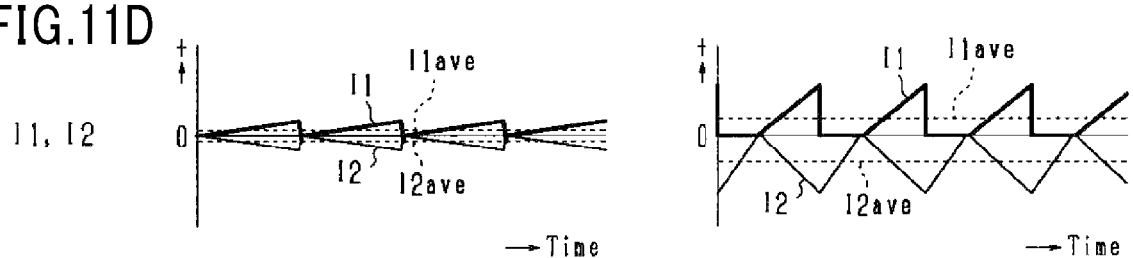
Figure 11E:
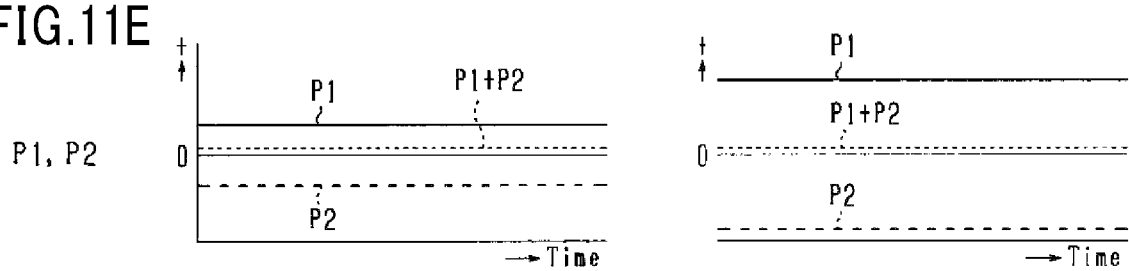

As illustrated in FIG. 11C, the control unit 70 can increase the difference between the first voltage V1 and the second voltage V2 by setting the command voltage V2* to a low value. Thus, referring to FIG. 11D, the amplitudes of the first current I1 and second current I2 are larger when the value of the command voltage V2* is $V\alpha$ than when the value of the command voltage V2* is $V\beta(<V\alpha)$.

Figure 11F:

As illustrated in FIG. 11F, the electric power loss P1+P2 is larger with V2*=$V\beta$ than with V2*=$V\alpha$.

When the difference between the first voltage V1 and the second voltage V2 is large, the reverse conduction current increases. This makes large the electric power loss P1+P2, thereby increasing the amount of heat generation due to power conversion.

Modification Example of Second Embodiment

Instead of increasing the difference between the first voltage V1 and the second voltage V2 by lowering the second voltage V2, the difference between the first voltage V1 and the second voltage V2 may be increased by raising the first voltage V1. In this case, the voltage difference can be increased by connecting a boost converter to a first high-potential terminal CH1 and a first low-potential terminal CL1 to control the output voltage from the booster converter to the electric power conversion apparatus 20.

Third Embodiment

Hereinafter, a third embodiment will be described with reference to the drawings, centering on differences from the second embodiment. In the first embodiment, the full-bridge circuits are used to configure the electric power conversion apparatus. Differently from this, in the present embodiment, a boost chopper circuit is used to configure the electric power conversion apparatus.

Figure 12:
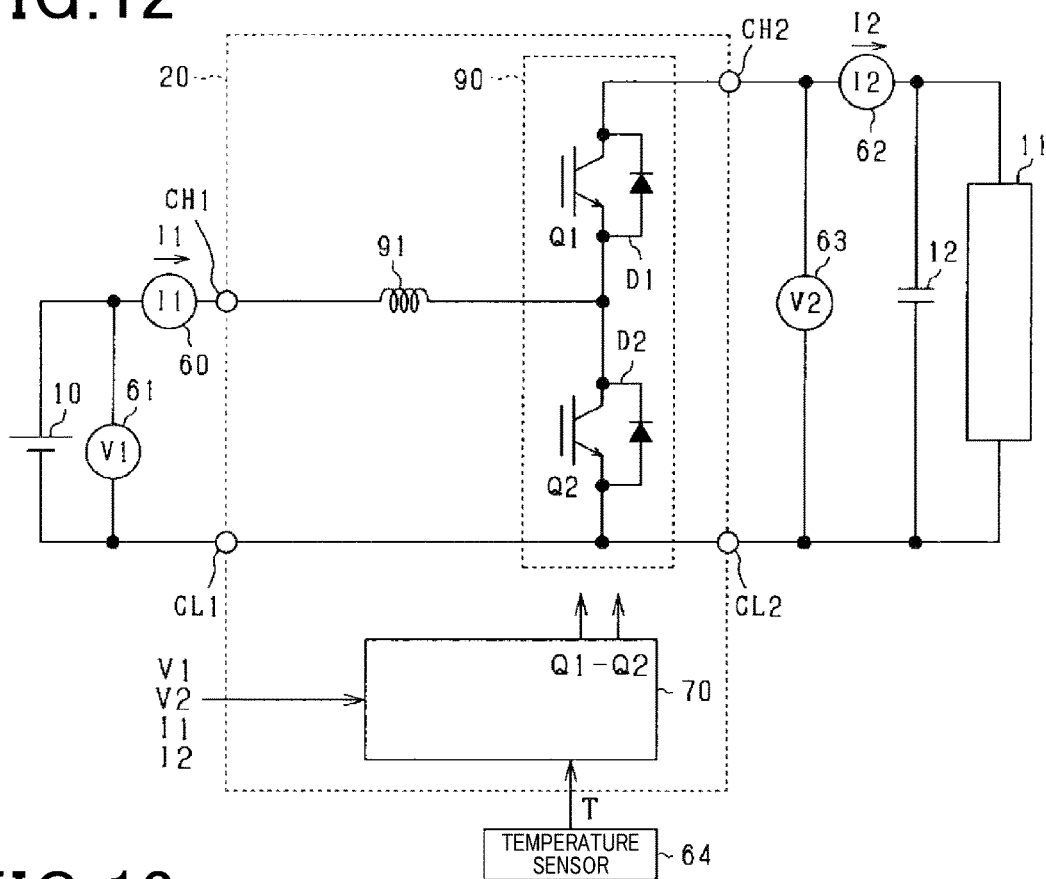
FIG. 12 is a configuration diagram of an electric power conversion apparatus according to a third embodiment.

FIG. 12 illustrates a configuration diagram of the present embodiment. In FIG. 12, components identical to those illustrated in FIG. 1 described above are given identical reference signs. An electric power conversion system includes an electricity storage battery 10, a power supply target 11, a capacitor 12, and an electric power conversion apparatus 20.

The electric power conversion apparatus 20 includes a first high-potential terminal CH1, a first low-potential terminal CL1, a second high-potential terminal CH2, a second low-potential terminal CL2, a half-bridge circuit 90, and a reactor 91. In the present embodiment, the half-bridge circuit 90 corresponds to an electric power conversion circuit.

The half-bridge circuit 90 includes a first switch Q1 and a second switch Q2. In the present embodiment, the first and second switches Q1 and Q2 are IGBTs. The second high-potential terminal CH2 is connected to the collector of the first switch Q1. The collector of the second switch Q2 is connected to the emitter of the first switch Q1. The first low-potential terminal CL1 and the second low-potential terminal CL2 are connected to the emitter of the second switch Q2. The second low-potential terminal CL2 is connected to the second high-potential terminal CH2 via the capacitor 12. The second low-potential terminal CL2 is connected to the second high-potential terminal CH2 via the power supply target 11.

First and second diodes D1 and D2 as freewheel diodes are connected in inverse parallel to the first and second switches Q1 and Q2. The first switch Q1 and the second switch Q2 are not limited to IGBTs and may be N-channel MOSFETs. In this case, the first diode D1 and the second diode D2 may not be provided.

The first end of the reactor 91 is connected to the first high-potential terminal CH1. The second end of the reactor 91 is connected to the emitter of the first switch Q1 and the collector of the second switch Q2. The positive terminal of the storage battery 10 is connected to the first high-potential terminal CH1, and the first low-potential terminal CL1 is connected to the negative terminal of the storage battery 10.

The electric power conversion system includes a first current sensor 60, a first voltage sensor 61, a second current sensor 62, a second voltage sensor 63, and a temperature sensor 64. The detection targets of these sensors are similar to those in the first embodiment.

The control unit 70 outputs drive signals to the gates of the first switch Q1 and second switch Q2 based on the detection values I1, V1, I2, V2, and T to turn on and off the first switch Q1 and the second switch Q2.

Figure 13:
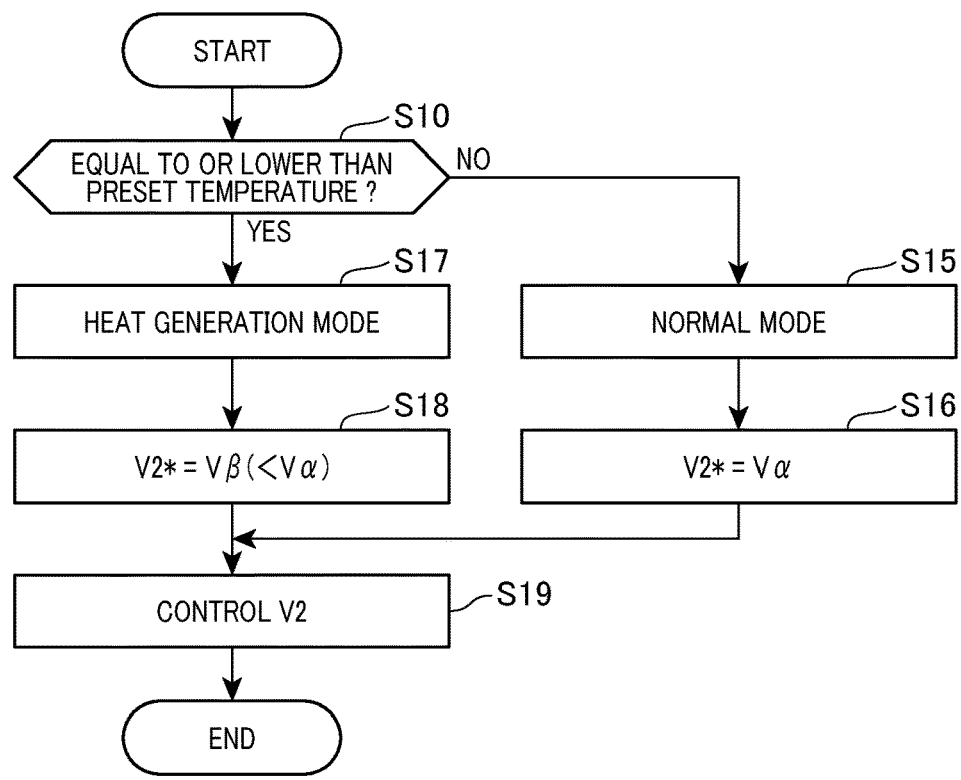
FIG. 13 is a flowchart of a processing procedure by a control unit.

FIG. 13 illustrates a procedure of processing executed by the control unit 70. This processing is repeatedly executed, for example, in a predetermined control cycle. In FIG. 13, identical steps as those illustrated in FIG. 6 described above are given identical reference signs for the sake of convenience.

In step S10, the control unit 70 determines whether an environmental temperature T is equal to or lower than a preset temperature.

If the negative determination is made in step S10, the processing proceeds to step S15 where the control unit 70 sets the control mode to the normal mode. In the normal mode, the first switch Q1 and the second switch Q2 are alternately turned on and off. In step S16, the control unit 70 sets the value of the command voltage V2* to Vα.

If the affirmative determination is made in step S10, the processing proceeds to step S17 where the control unit 70 sets the control mode to the heat generation mode. In the heat generation mode, the control unit 70 fixes the first switch Q1 in the off state, and turns on and off the second switch Q2. Then, in step S18, the control unit 70 sets the value of the command voltage V2* to Vβ. The value of Vβ is smaller than Vα.

In step S19, the duty ratio of the second switch Q2 is controlled such that the second voltage V2 is controlled to the command voltage V2*. The duty ratio is the ratio (Ton/Tsw) of an on-period Ton to one switching cycle Tsw of the second switch Q2.

In the present embodiment, in the heat generation mode, the value of the command voltage V2* is set to Vβ smaller than Vα, thereby making the difference between the first voltage V1 and the second voltage V2 smaller than that in the normal mode. This increases the reverse conduction current flowing input into the first switch Q1. Accordingly, it is possible to make the electric power loss P1+P2 large to increase the amount of heat generation due to power conversion.

Fourth Embodiment

Hereinafter, a fourth embodiment will be described with reference to the drawings, centering on a difference from the first embodiment. In the present embodiment, a switching pattern in a heat generation mode is changed.

If fifth to eighth switches Q5 to Q8 are fixed in the off state in the heat generation mode, when the difference between a first voltage V1 and a second voltage V2 is small, reverse conduction current flowing input into the fifth to eighth switches Q5 to Q8 becomes also small. As a result, the electric power loss P1+P2 cannot be increased, and the amount of heat generation by power conversion may not be increased. Thus, in the present embodiment, there are provided periods during which the fifth to eighth switches Q5 to Q8 are temporarily turned on to increase the reverse conduction current.

Hereinafter, referring to FIGS. 14 and 15, temperature-rise control with temporary on periods under which the fifth to eighth switches Q5 to Q8 are temporarily turned on will be described in comparison with temperature-rise control without the temporary on periods under which the fifth to eighth switches Q5 to Q8 are fixed in the off state (that is, the temperature-rise control in the first embodiment).

FIGS. 14A to 14D illustrate transitions of operational states of the switches Q1 to Q8 with and without the temporary on periods. FIG. 14A illustrates the transitions of the operational states of the first to fourth switches Q1 to Q4. The solid lines in FIG. 14A illustrate the transitions of the operational states of the first switch Q1 and fourth switch Q4. The operational states obtained by reversing the operational states of the first switch Q1 and fourth switch Q4 are the operational states of the second switch Q2 and third switch Q3. In the present embodiment, an inter-leg phase φ1 is set to 180°. FIGS. 14B to 14E illustrate the operational states of the fifth to eighth switches Q5 to Q8. FIG. 14F illustrates the transition of a first current I1, and FIG. 14G illustrates the transition of a second current I2.

As illustrated in the cases with the temporary on periods in FIGS. 14B to 14E, in the cases with the temporary on periods in the present embodiment, there are periods during which the fifth to eighth switches Q5 to Q8 are temporarily turned on within one switching cycle Tsw. Herein, ninth to eleventh periods T9 to T11 within one switching cycle Tsw in the case with the temporary on periods illustrated in FIG. 14A will be described. The ninth period T9 is a period during which the second, third, fifth, and eighth switches Q2, Q3, Q5, and Q8 are turned on and the first, fourth, sixth, and seventh switches Q1, Q4, Q6, and Q7 are turned off. The tenth period T10 is a period during which the second and third switches Q2 and Q3 are turned on and the first, fourth, fifth, sixth, seventh, and eighth switches Q1, Q4, Q5, Q6, Q7, and Q8 are turned off. The eleventh period T11 is a period during which the first and fourth switches Q1 and Q4 are turned on and the second, third, fifth, sixth, seventh, and eighth switches Q2, Q3, Q5, Q6, Q7, and Q8 are turned off.

FIG. 15A illustrates current paths in the ninth period T9. In a first full-bridge circuit 30, the current path is formed including a first high-potential terminal CH1, the third switch Q3, a first coil 50a, the second switch Q2, and a first low-potential terminal CL1. On the other hand, in a second full-bridge circuit 40, the current path is formed including a second high-potential terminal CH2, the fifth switch Q5, a second coil 50b, the eighth switch Q8, and a second low-potential terminal CL2.

Accordingly, as illustrated in the case with the temporary on periods in FIG. 14F, in the ninth period T9, the first current I1 gradually increases in the positive direction. An induced voltage from the second coil 50a and a voltage between the second high-potential terminal CH2 and the second low-potential terminal CL2 are applied to the second full-bridge circuit 40, so that current flows to bring the fifth switch Q5 and the eighth switch Q8 in the on state to forward conduction. As a result, as illustrated in the case with the temporary on periods in FIG. 14G, the second current I2 also gradually increases in the positive direction.

FIG. 15B illustrates current paths in the tenth period T10. In the first full-bridge circuit 30, the same current path as that in the ninth period T9 is formed. In the second full-bridge circuit 40, the current path is formed including the second low-potential terminal CL2, the sixth switch Q6, the second coil 50b, the seventh switch Q7, and the second high-potential terminal CH2. In this case, the current flows in body diodes built in the sixth switch Q6 and the seventh switch Q7. That is, the sixth switch Q6 and the seventh switch Q7 are reversely conducted.

As illustrated in FIG. 15B, in the tenth period T10, the current continuously flows in the first full-bridge circuit 30 in the same current path as that in the ninth period T9. Thus, the first current I1 continuously flows in the positive direction. On the other hand, in the second full-bridge circuit 40, the current increased in the ninth period T9 flows in the negative direction of the second current I2. Thus, as illustrated in the case with the temporary on periods in FIG. 14G, the sign of the second current I2 becomes negative and its absolute value gradually increases.

As described above, in the present embodiment, the forward conduction current is increased via the fifth switch Q5 and eighth switch Q8 turned on in the ninth period T9. The increased current flows as the reverse conduction current in the tenth period T10 via the sixth switch Q6 and the seventh switch Q7. Thus, even if the difference between the first voltage V1 and the second voltage V2 is small, it is possible to increase the reverse conduction current.

FIG. 15C illustrates current paths in the eleventh period T11. In the first full-bridge circuit 30, the current path is formed including the first low-potential terminal CL1, the fourth switch Q4, the first coil 50a, the first switch Q1, and the first high-potential terminal CH1. On the other hand, in the second full-bridge circuit 40, the same current path as that in the tenth period T10 is formed.

In the eleventh period T11, the first coil 50a has a temporarily induced voltage with which its first end is higher in potential than its second end. Thus, as illustrated in the case with the temporary on periods in FIG. 14F, the sign of the first current I1 becomes negative and its absolute value gradually decreases. On the other hand, in the second full-bridge circuit 40, the current continuously flows in the same path as that in the tenth period T10. Thus, the sign of the second current I2 remains negative and its absolute value gradually decreases.

As illustrated in FIG. 14G, in the heat generation mode, among the switches Q5 to Q8 constituting the second full-bridge circuit 40, the switch in which the forward conduction current flows is temporarily turned on. Thus, it is possible to increase the reverse conduction current in comparison to the case where the switches Q5 to Q8 are fixed in the off state. Accordingly, the electric power loss P1+P2 can be made large so that it is possible to increase the amount of heat generation due to power conversion.

The forwardly conducted switch may be preferably turned on at the timing when the second current I2 becomes zero. This makes it possible to swiftly increase the absolute value of the second current I2 and increase a loss due to the subsequent reverse conduction current. However, an advantageous effect similar to that of the present embodiment can be obtained, and thus the timing for temporarily turning on the switch is not limited to the timing when the second current I2 becomes zero.

If the duration of on time of the forwardly conducted switch is increased, the reverse conduction current increases but the time of heat generation due to the reverse conduction current decreases. Thus, as the duration of on time of the forwardly conducted switch increases, the amount of heat generation in one switching cycle reaches the local maximum value and then starts to decrease. By designing this characteristic in advance or performing feed-back control of the duration of time as needed in accordance with the amount of heat generation, the duration of on time of the forwardly conducted switch may be set to the duration of time in which a desired amount of heat generation can be obtained.

Fifth Embodiment

Hereinafter, a fifth embodiment will be described with reference to the drawings, centering on differences from the first embodiment. In the first embodiment, the fifth to eighth switches Q5 to Q8 are configured as N-channel MOSFETs. Differently from this, in the present embodiment, fifth to eighth switches Q5 to Q8 are GaN-HEMTs where GaN is gallium nitride and HEMT is high-electron-mobility transistor.

Figure 16:
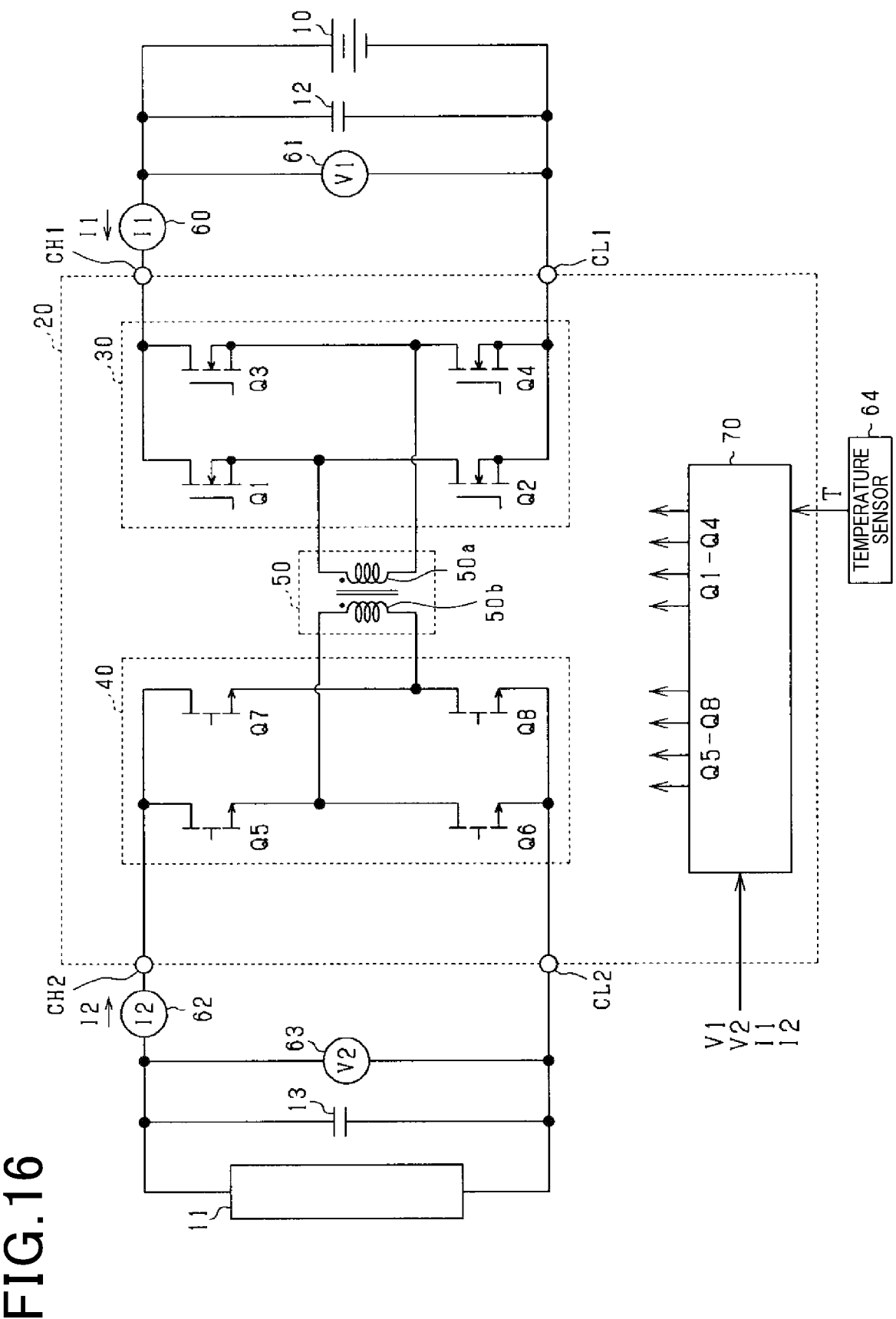
FIG. 16 is a configuration diagram of an electric power conversion apparatus according to a fifth embodiment.

FIG. 16 is a configuration diagram of the present embodiment. In FIG. 16, the same reference signs as those illustrated in FIG. 1 described above are given for the sake of convenience. However, the fifth to eighth switches Q5 to Q8 are GaN-HEMTs in this configuration. A GaN-HEMT is a switching device that has a characteristic of having an increased voltage drop during reverse conduction with application of a negative voltage to the gate.

Figure 17:
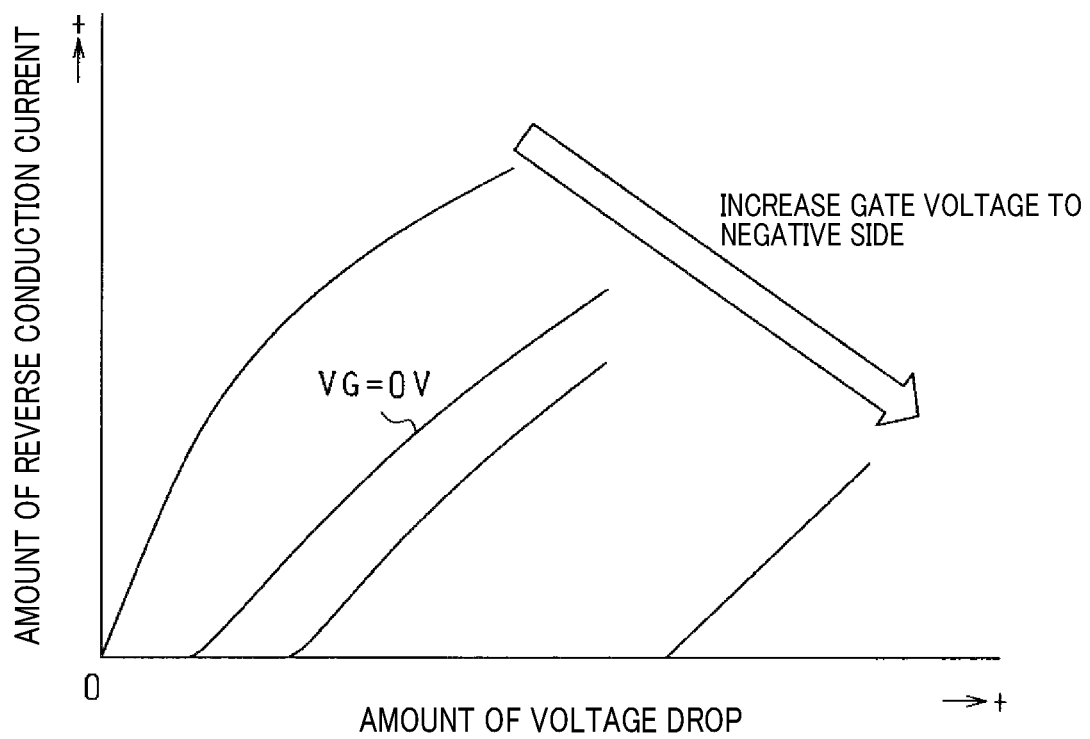
FIG. 17 is a diagram illustrating a characteristic of reverse conduction current flowing in a GaN-HEMT.

FIG. 17 is a diagram illustrating the characteristic of reverse conduction current flowing in a GaN-HEMT, where the vertical axis indicates the amount of reverse conduction current, and the lateral axis indicates the amount of a voltage drop. The arrow in FIG. 17 indicates the direction in which a gate voltage VG is increased to the negative side. It can be seen that, as the gate voltage VG increases to the negative side, the amount of a voltage drop due to the reverse conduction current in the GaN-HEMT increases.

In order to perform temperature-rise control in the heat generation mode, a control unit 70 fixes the fifth to eighth switches Q5 to Q8 in the off state. The control unit 70 turns the gate voltage to apply to turn off the fifth to eighth switches Q5 to Q8 in the heat generation mode, into a negative voltage. At this time, the control unit 70 increases the gate voltage to apply to turn off the fifth to eighth switches Q5 to Q8 to the negative side in comparison to in the normal mode, thereby increasing the amount of a voltage drop due to the reverse conduction current. Accordingly, electric power loss P1+P2 can be made large, so that it is possible to increase the amount of heat generation due to power conversion.

Sixth Embodiment

Hereinafter, a sixth embodiment will be described with reference to the drawings, centering on differences from the first embodiment. In the sixth embodiment, a heat transfer unit is added to the configuration of the first embodiment.

Figure 18:
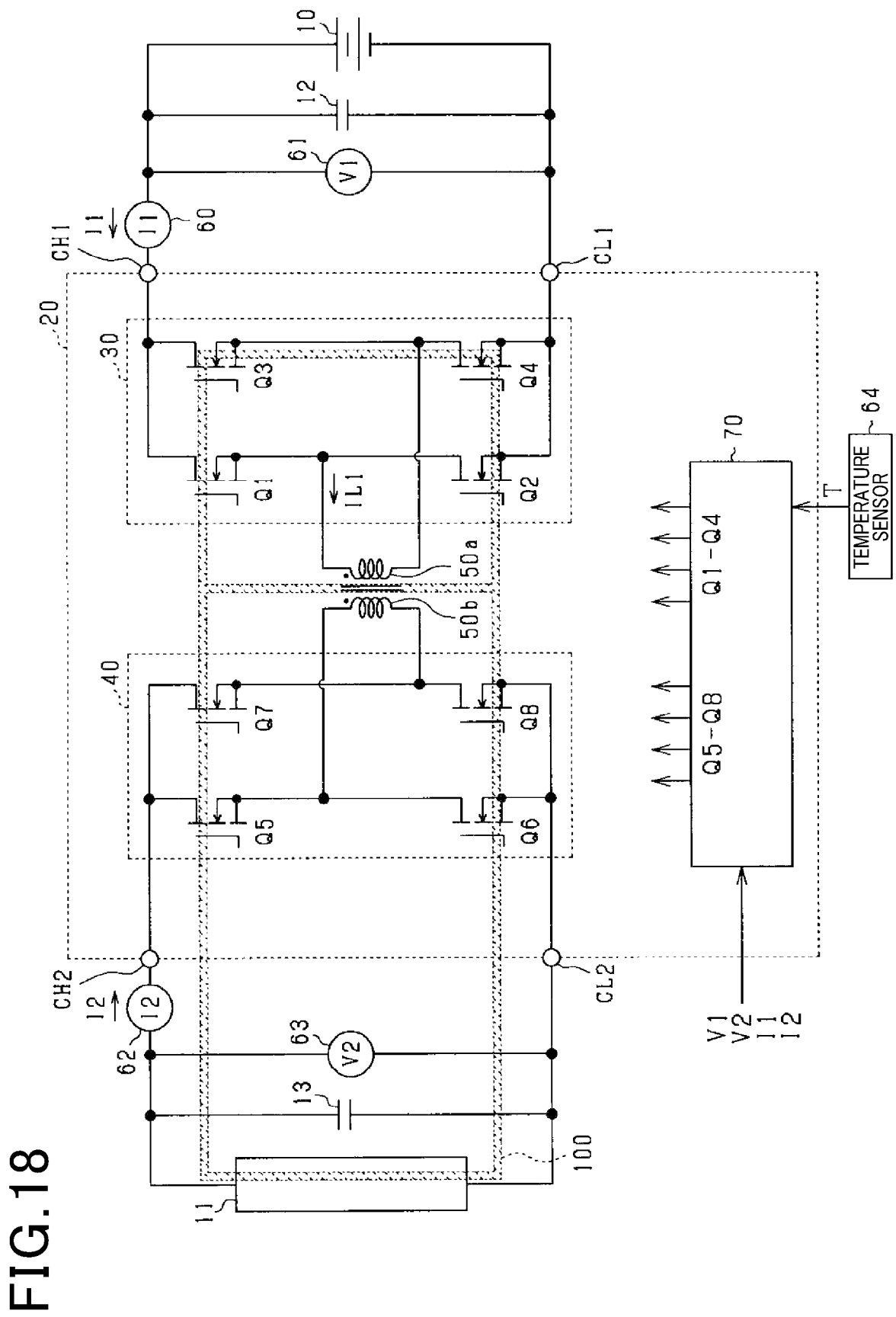
FIG. 18 is a configuration diagram of an electric power conversion apparatus according to a sixth embodiment.

FIG. 18 is a configuration diagram of the present embodiment. In FIG. 18, components identical to those illustrated in FIG. 1 described above are given identical reference signs for the sake of convenience. An electric power conversion apparatus 20 includes a heat transfer unit 100. In the present embodiment, the heat transfer unit 100 is capable of absorbing heat from heat exchange target elements that are switches Q1 to Q8, a transformer 50, and a power supply target 11. The heat transfer unit 100 transfers the absorbed heat to a temperature-rise target element to increase the temperature of the temperature-rise target element. The temperature-rise target element is, for example, the power supply target 11.

The heat transfer unit 100 may include a circulation path in which cooling water circulates between the heat transfer target element and the temperature-rise target element to raise the temperature of the temperature-rise target element via the cooling water. Besides, the heat transfer unit 100 may use a gas (air) as a cooling fluid, for example. Otherwise, the heat transfer unit 100 may not use a cooling fluid, for example, but may be a constitutional element such as a heat sink that contacts the heat exchange target element and the temperature-rise target element.

This makes it possible to collect the heat generated due to power conversion and transfer the heat to the temperature-rise target element, so that the temperature of the temperature-rise target element can be efficiently raised.

Other Embodiments

The above-described embodiments may be modified as described below.

In the third embodiment, the first switch Q1 may be a GaN-HEMT. Even in this case, increasing the gate voltage to turn off the first switch Q1 to the negative side in comparison to that in the normal mode makes it possible to increase the amount of a voltage drop during reverse conduction of current. Therefore, the amount of heat generation due to power conversion can be increased.

The control unit and its operations described in the present disclosure may be implemented by a dedicated computer provided by configuring a processor or memory to be programmed to perform one or more functions embodied by computer programs. Alternatively, the control unit and its operations described in the present disclosure may be implemented by a dedicated computer provided by configuring a processor with one or more dedicated hardware logic circuits. Otherwise, the control unit and its operations described in the present disclosure may be implemented by one or more indicated computers configured with a combination of a processor and memory programmed to perform one or more functions and a processor configured by one or more hardware logic circuits. In addition, the computer programs may be stored as instructions to be executed by a computer, in a computer-readable non-transitory tangible recording medium.

The present disclosure has been described above in accordance with the embodiments, but it should be understood that the present disclosure is not limited to the embodiments and structures. The present disclosure also includes various modification examples and modifications within the scope of equivalence. In addition, various combinations and modes, and other combinations and modes including only one element of the foregoing combinations and modes, less or more than the one element are included in the scope and conceptual range of the present disclosure.

What is claimed is:

1. An electric power conversion apparatus that has an input terminal, an output terminal, and a switch unit, and turns on and off the switch unit to transfer electric power from an electric storage unit connected to the input terminal to a power supply target connected to the output terminal, wherein the switch unit has a characteristic of, when reverse conduction current flows in the switch unit, causing a larger conduction loss in an off state than in an on state, the electric power conversion apparatus comprising:

a determination unit that determines whether there is a request for increasing an amount of heat generation due to the electric power transfer; and a control unit that, when it is determined that there is the request for increasing the amount of heat generation, turns off the switch unit into which the reverse conduction current flows during the electric power transfer, and when it is determined that there is no request for increasing the amount of heat generation, turns on the switch unit into which the reverse conduction current flows during the electric power transfer, wherein the switch unit has a characteristic of, with a gate voltage greater to a negative side, having a larger conduction loss caused when the reverse conduction current flows, and when it is determined that there is the request for increasing the amount of heat generation, the control unit increases the gate voltage of the switch unit in which the reverse conduction current flows to the negative side in comparison to a case where it is determined that there is no request for increasing the amount of heat generation.

2. The electric power conversion apparatus according to claim 1, wherein when it is determined that there is the request for increasing the amount of heat generation, the control unit controls a difference between a voltage to apply to the input terminal and a voltage to apply to the output terminal, in a direction in which the reverse conduction current flowing in the switch unit is larger than when it is determined that there is no request for increasing the amount of heat generation.

3. The electric power conversion apparatus according to claim 1, further comprising:

a transformer having a first coil and a second coil that are magnetically coupled to each other;

a conversion circuit that is connected to the input terminal and the first coil and converts a direct-current voltage supplied from the electrical storage unit into an alternating voltage and applies the alternating voltage to the first coil; and a full-bridge circuit that is connected to the output terminal and the second coil and has the switch unit, wherein when it is determined that there is the request for increasing the amount of heat generation, the control unit temporarily turns on the switch unit in a period during which forward conduction current flows in the switch unit during the electric power transfer.

4. The electric power conversion apparatus according to claim 1, further comprising:

a heat transfer unit that absorbs heat generated due to turn-on and turn-off of the switch unit and transfers the heat to a temperature-rise target element.

\* \* \* \* \*